United States Patent
Kitazoe

(10) Patent No.: US 8,090,369 B2
(45) Date of Patent: Jan. 3, 2012

(54) USER EQUIPMENT CAPABILITY HANDLING IN LONG-TERM EVOLUTION SYSTEMS

(75) Inventor: Masato Kitazoe, Hachiouji (JP)

(73) Assignee: Qualcomm Incorporated, San Diego, CA (US)

( * ) Notice: Subject to any disclaimer, the term of this patent is extended or adjusted under 35 U.S.C. 154(b) by 850 days.

(21) Appl. No.: 12/112,357

(22) Filed: Apr. 30, 2008

(65) Prior Publication Data

US 2009/0011783 A1 Jan. 8, 2009

Related U.S. Application Data

(60) Provisional application No. 60/915,384, filed on May 1, 2007.

(51) Int. Cl.
*H04W 4/00* (2009.01)
(52) U.S. Cl. .................. 455/433; 455/432.1
(58) Field of Classification Search .................. 455/433, 455/68, 432.1, 414.1
See application file for complete search history.

(56) References Cited

U.S. PATENT DOCUMENTS

| | | | |
|---|---|---|---|
| 5,915,220 A * | 6/1999 | Chelliah | 455/435.2 |
| 6,683,853 B1 | 1/2004 | Kannas et al. | |
| 7,369,855 B2 | 5/2008 | O'Neill et al. | |
| 7,443,835 B2 | 10/2008 | Lakshmi et al. | |
| 2002/0094819 A1* | 7/2002 | Cao et al. | 455/453 |
| 2004/0203759 A1 | 10/2004 | Shaw et al. | |
| 2005/0107100 A1 | 5/2005 | Gustafsson et al. | |
| 2006/0030326 A1 | 2/2006 | O'neill et al. | |
| 2009/0093280 A1* | 4/2009 | Kitazoe | 455/574 |

FOREIGN PATENT DOCUMENTS

WO 2008043078 4/2008

OTHER PUBLICATIONS

Partial International Search Report. PCT/US08/062276, International Search Authority, European Patent Office, Oct. 27, 2008.
International Search Report, PCT/US2008/062276, International Searching Authority, European Patent Office, Feb. 26, 2009.
Written Opinion, PCT/US2008/062276, International Searching Authority, European Patent Office, Feb. 26, 2009.

* cited by examiner

*Primary Examiner* — Lewis West
(74) *Attorney, Agent, or Firm* — Milan Patel; Larry Moskowitz

(57) ABSTRACT

Systems, methodologies, and devices are described that facilitate management of user equipment (UE) capability information in a network to facilitate improved connection and communications associated with a mobile device. A core network can include a capability management component that can control UE capability information received during an initial connection of the mobile device to the network, where the UE capability information comprises UE dynamic capability and UE semi-static capability. The UE dynamic capability and semi-static capability can be identified from the received capability information and stored and managed respectively. When the initial connection is released, the dynamic capability information is deleted while the semi-static capability information can be retained in the core network. During a subsequent connection of the mobile device to the network, the stored semi-static capability can be retrieved and utilized to facilitate efficiently selecting a desired dynamic capability for the subsequent connection and communication.

8 Claims, 15 Drawing Sheets

USER EQUIPMENT CAPABILITY HANDLING IN LONG-TERM EVOLUTION SYSTEMS

CROSS-REFERENCE TO RELATED APPLICATIONS

This application claims the benefit of U.S. Provisional Patent application Ser. No. 60/915,384 entitled "USER EQUIPMENT (UE) CAPABILITY HANDLING IN LTE" which was filed May 1, 2007, the entirety of the aforementioned application is herein incorporated by reference.

BACKGROUND

I. Field

The following description relates generally to wireless communications, and more particularly to managing capability information (e.g., dynamic capability, semi-static capability) associated with a mobile device to facilitate efficient connection of the mobile device to a network, and communication associated with the mobile device within a network, in a wireless communication environment.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Third Generation Partnership Project (3GPP) Long-Term Evolution (LTE) systems, Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. This communication link can be established via a single-in-single-out, multiple-in-signal-out or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into Ns independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In a TDD system, the forward and reverse link transmissions can be on the same frequency region so that the reciprocity principle allows the estimation of the forward link channel from the reverse link channel. This can enable the access point to extract transmit beamforming gain on the forward link when multiple antennas are available at the access point Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Typically, base stations can be associated with a core network that can be a centralized part of a wireless communications system. Conventionally, capability (e.g., supported classes of data rates) of a mobile device can be stored in a base station and the core network when a connection (e.g., attach) is performed. However, portions of the capability information of a mobile device can be dynamic in nature, and storage of such dynamic capability information of the mobile device can be wasteful and unnecessary when the dynamic capability information is no longer valid. It is desirable to be able to identify a dynamic portion and a semi-static portion of the capability information of a mobile device. It is also desirable to efficiently store and manage capability information of a mobile device in the core network.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating efficient connection and communication associated with a communication device (e.g., mobile device) within a network by managing capability information associated with the communication device.

In accordance with Various aspects of the disclosed subject matter, a core network can control user equipment (UE) capability information associated with a mobile device (e.g., UE) to facilitate efficient connection of a mobile device to, and communication of the mobile device with, a network (e.g., base station and core network). During an initial connection of the mobile device to the base station and core network, the core network can receive, respectively identify, and/or store UE capability information, such as UE dynamic capability information and UE semi-static capability information, from the mobile device (e.g., via the associated base station). The UE capability information can be utilized to facilitate selecting UE dynamic capability (e.g., UE class) for communication during the connection. When the connection is released, such as when the mobile device transitions to an idle mode, the core network can delete or release the UE dynamic capability information, but can retain in storage the UE semi-static capability information related to the mobile device. During a subsequent connection of the mobile device to the network, such as when the mobile device transitions from the idle mode to active mode, the UE semi-static capability information associated with the mobile device that is stored in the network can be utilized to facilitate selecting a desired (e.g. optimal) UE dynamic capability to be utilized by the mobile device during the subsequent connection and communication associated with the mobile device. In addition, to facilitate selection of a desired UE dynamic capability during the subsequent connection, the mobile device optionally can provide a preferred UE dynamic capability to the network (e.g., base station, core network), such as, for example, where the mobile device has knowledge regarding the initiated service (e.g. phone call, message, . . . ) related to the communication.

According to related aspects, a method that facilitates communication associated with a mobile device is described herein. The method can include identifying one or more items of information from the received capability information based at least in part on predefined identification criteria, the one or more items of information comprising at least one of dynamic capability information or semi-static capability information associated with the mobile device. Further, the method can comprise controlling storage of capability information associated with a core network.

Another aspect relates to a wireless communications apparatus. The wireless communications apparatus can include a memory that retains instructions related to identification of dynamic capability and semi-static capability associated with the mobile device based at least in part on predefined identification criteria. Further, the wireless communications apparatus can include a processor, coupled to the memory, configured to execute the instructions retained in the memory.

Yet another aspect relates to a wireless communications apparatus that facilitates communication associated with a mobile device. The wireless communications apparatus can include means for respectively identifying dynamic capability and semi-static capability associated with the mobile device based at least in part on predefined identification criteria. Further, the wireless communications apparatus can comprise means for controlling storage of capability information associated with the mobile device.

Still another aspect relates to a computer program product, comprising: a computer-readable medium comprising code for: identifying dynamic capability and semi-static capability associated with a mobile device based at least in part on predefined identification criteria; and controlling storage of capability information associated with the mobile device.

In accordance with another aspect, an apparatus in a wireless communication system can include a processor, wherein the processor can be configured to identify dynamic capability and semi-static capability associated with the mobile device based at least in part on predefined identification criteria. Moreover, the processor can be configured to manage storage of capability information associated with the mobile device.

According to other aspects, a method that facilitates communication associated with a mobile device is described herein. The method can include selecting a dynamic capability associated with the mobile device based at least in part on predefined selection criteria. Further, the method can comprise transmitting the dynamic capability associated with the mobile device.

Yet another aspect relates to a wireless communications apparatus that can include a memory that retains instructions related to selection of a dynamic capability associated with a mobile device based at least in part on predefined selection criteria. Further, the wireless communications apparatus can comprise a processor, coupled to the memory, configured to execute the instructions retained in the memory.

Another aspect relates to a wireless communications apparatus that facilitates communication associated with a mobile device. The wireless communications apparatus can include means for selecting a dynamic capability associated with the mobile device based at least in part on predefined selection criteria. Further, the wireless communications apparatus can include means for transmitting capability information associated with the mobile device, the capability information comprising information related to at least one of the dynamic capability or a semi-static capability associated with the mobile device.

Still another aspect relates to a computer program product, comprising: a computer-readable medium comprising code for: selecting a dynamic capability associated with a mobile device based at least in part on predefined selection criteria, and transmitting capability information associated with the mobile device, the capability information comprising information related to at least one of the dynamic capability or a semi-static capability associated with the mobile device.

In accordance with another aspect, an apparatus in a wireless communication system can include a processor, wherein the processor can be configured to select a dynamic capability associated with a mobile device based at least in part on predefined selection criteria. Further, the processor can be configured to transmit capability information associated with the mobile device.

According to still other aspects, a method that facilitates communications associated with a mobile device is described herein. The method can include receiving capability information associated with the mobile device, the capability information comprising information related to at least one of dynamic capability or semi-static capability associated with the mobile device. Further, the method can comprise selecting a dynamic capability associated with the mobile device based at least in part on predefined selection criteria.

Yet another aspect relates to a wireless communications apparatus that can include a memory that retains instructions related to selection of a dynamic capability associated with a mobile device based at least in part on predefined selection criteria. Further, the wireless communications apparatus can comprise a processor, coupled to the memory, configured to execute the instructions retained in the memory.

Another aspect relates to a wireless communications apparatus that facilitates communications associated with a mobile device in a wireless communication environment. The wireless communications apparatus can include means for selecting a dynamic capability associated: with the mobile device based at least in part on predefined selection criteria. Further, the wireless communications apparatus can include means for transmitting capability information associated with the mobile device, the capability information including information relating to at least one of dynamic capability or semi-static capability associated with the mobile device.

Still another aspect relates to a computer program product, comprising: a computer-readable medium comprising code for: selecting a dynamic capability associated with a mobile device based at least in part on predefined selection criteria, and transmitting capability information associated with the mobile device to facilitate communications associated with the mobile device, the capability information comprising information related to at least one of dynamic capability or semi-static capability associated with the mobile device.

In accordance with another aspect, an apparatus in a wireless communication system can include a processor, wherein the processor can be configured to evaluate information associated with capability associated with a mobile device. Further, the processor can be configured to select a dynamic capability associated with the mobile device based at least in part on predefined selection criteria. Moreover, the processor can be configured to transmit at least one signal associated with selection of the dynamic capability to the mobile device.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
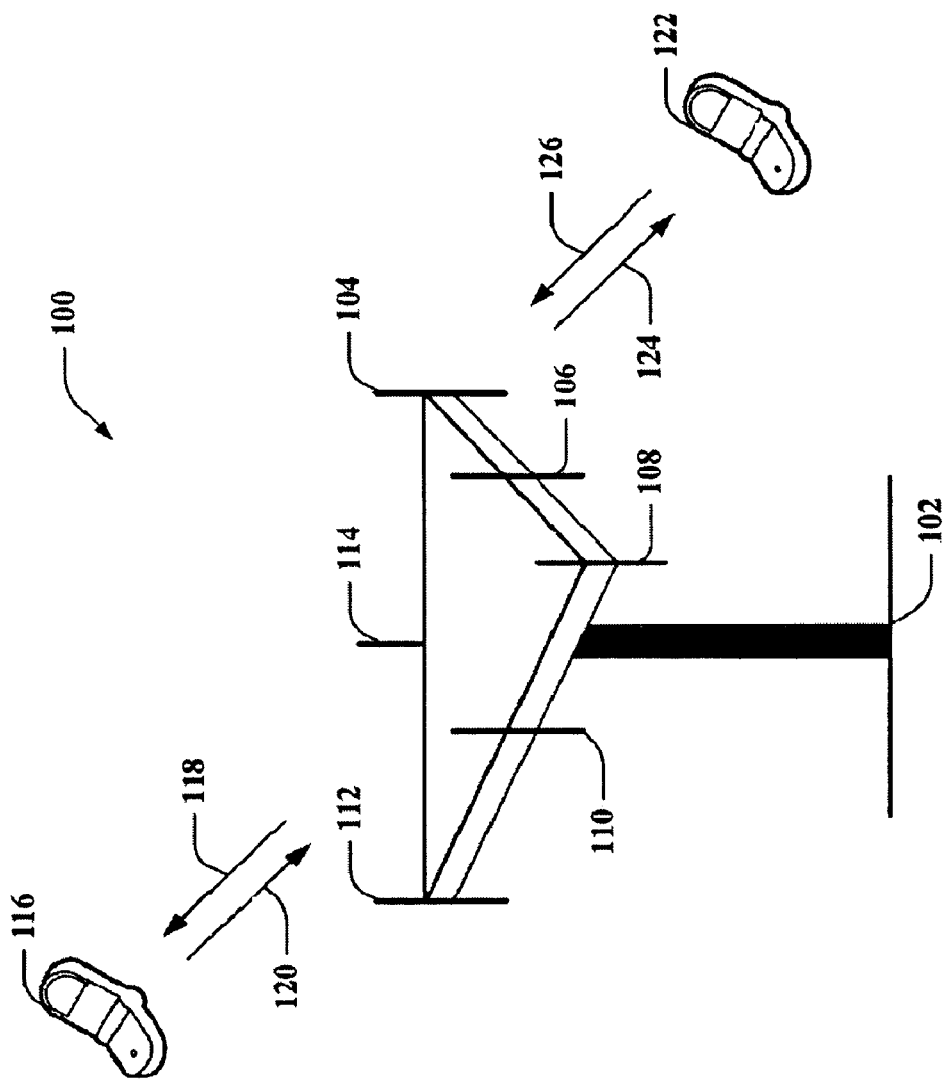
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like can refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMO, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2). These various radio technologies and standards are known in the art.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device or user equipment (UE). A mobile device can be a cellular telephone a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B (e.g., evolved Node B, eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 (e.g., downlink (DL)) and receive information from mobile device 116 over a reverse link 120 (e.g., uplink (UL)). Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices (e.g., 116) in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
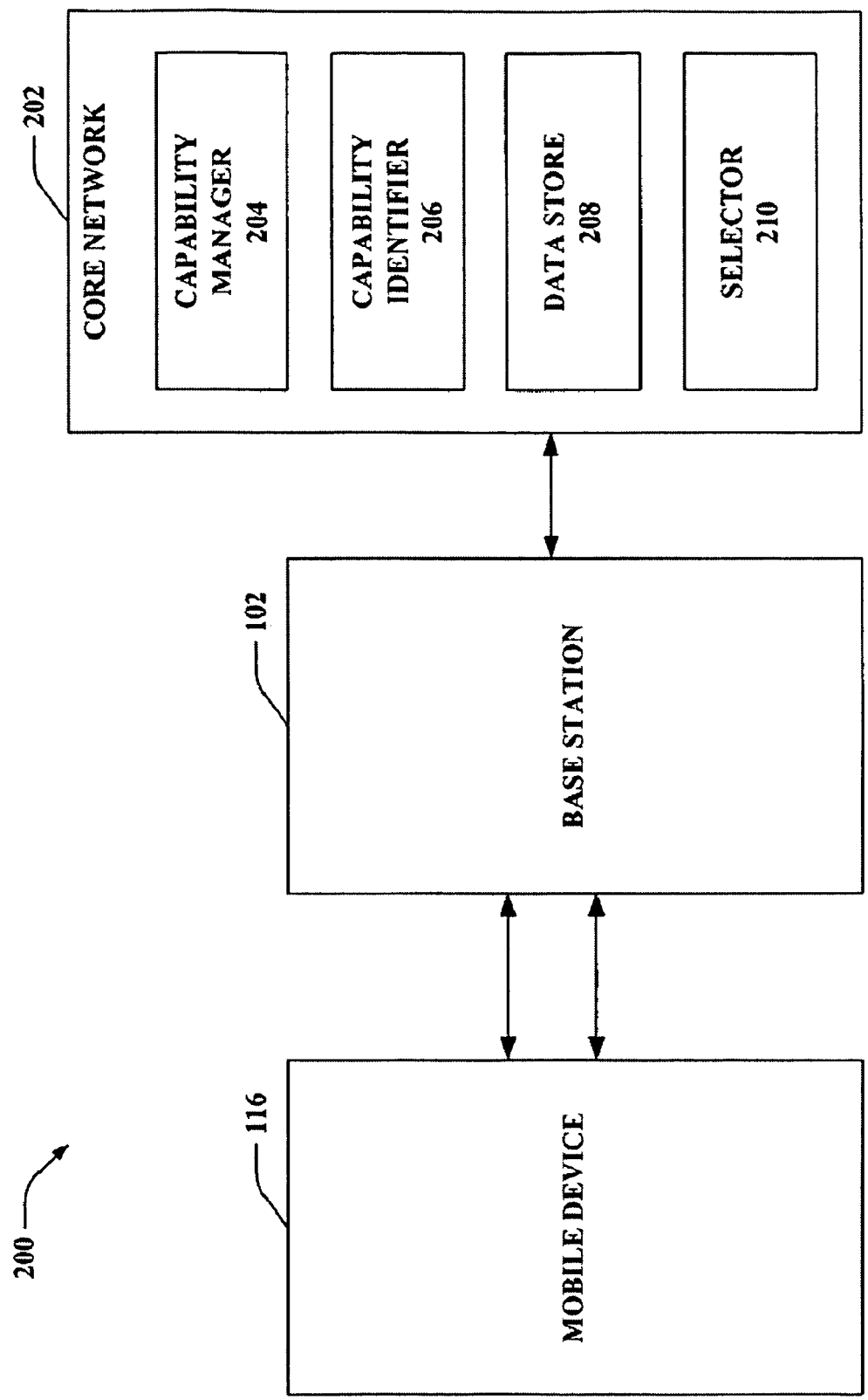
FIG. 2 is an illustration of an example system that can facilitate communication associated with a mobile device within a wireless communication environment in accordance with an aspect of the disclosed subject matter.

In accordance with an aspect, a mobile device (e.g., 116) can be configured to transmit UE capability information of the mobile device 116 to the base station 102, which can transmit such UE capability information to the core network (e.g., as depicted in FIG. 2 and described herein). The UE capability information can comprise UE dynamic capability, which can include a UE class (e.g., peak data rates for UL and DL) to be used (or requested to be used by the mobile device 116) for a particular initiated service (e.g., communication), and UE semi-static capability, which can include supported UE classes (e.g., supported data rate classes), protocol version, other UE capabilities that are hard-coded in nature (e.g., frequency band capability, inter-Radio-Access-Technology (inter-RAT) capability, etc.), etc.

For instance, the UE dynamic capability can be related to the separation of processing power of the mobile device 116 between UL and DL, where peak data rates for UL and DL can be specified as a UE dynamic capability. With regard to UE semi-static capability, a mobile device (e.g., 116) may have a defined capability, such as 60 Mbps worth of processing power in total, for example, where there can be one supported UE class that can be 10 Mbps for UL and 50 Mbps for DL, another supported UE class can be 20 Mbps for UL and 40 Mbps for DL, and there can be other supported UE classes with other different UL and DL data rates, as desired. The UE semi-static capability can be utilized by a core network (e.g., as depicted in FIG. 2 and described herein) for various purposes, such as prioritization or load balancing, for example. In another aspect, the mobile device (e.g., 116) can be capable of operating and communicating in LTE, UMTS, GSM, multi-mode, multi-RAT, etc.

The base station 102 can receive the UE capability information from the mobile device 116, and can store the UE capability information. The base station 102 also can transmit the UE capability information to the core network, where the UE capability information can be stored in the core network. Based at least in part on predefined selection criteria, the core network and/or the base station 102 can select a UE dynamic capability (e.g., UE class) for the mobile device 116, and the base station 102 can transmit information related to the selected UE dynamic capability to the mobile device 116, so the mobile device 116 can be configured to communicate in the network using the selected UE dynamic capability. The predefined selection criteria can include, for example, type of communication (e.g., voice calling, messaging, best effort data, protocol layer signaling, etc.), whether the communication is DL centric or UL centric, UE dynamic capability, UE semi-static capability, and/or other factors.

For instance, during an initial connection (e.g., attach) of the mobile device 116 to the network, the mobile device 116 can transmit its UE dynamic capability and UE semi-static capability to the base station 102, which can store such UE capability information. The UE capability information can be transmitted as part of or in relation to a connection request message. The base station 102 can transmit the UE capability information of the mobile device 116 to the core network, for example, as part of or in relation to the connection request message, and the core network can identify and store the UE dynamic capability information and the UE semi-static capability information, respectively. The core network and/or the base station 102 can facilitate selecting the UE dynamic capability (e.g., UE class) to be utilized during the communication associated with the mobile device 116 based at least in part on predefined selection criteria. The core network can store and maintain the UE semi-static capability and/or UE dynamic capability of the mobile device 116 during the connection.

Conventionally, the network does not identify or distinguish between UE dynamic capability and UE semi-static capability of a mobile device with regard to managing such information. When a connection between a mobile device and the network is released such as when the mobile device is transitioned from active mode to an idle mode, the UE capability (e.g., UE dynamic capability and UE semi-static capability) is deleted or released by the network. As a result, if and when the mobile device is transitioned to an active mode and a connection setup is performed to connect the mobile device to the network, the mobile network has to transmit UE dynamic capability and UE semi-static capability to the network to facilitate establishing the connection.

In accordance with an aspect of the disclosed subject matter, the core network can retain and manage storage of the semi-static capability of the mobile device 116 after the connection associated with the mobile device 116 is released (e.g., mobile device 116 is transitioned to idle mode). In one aspect, upon a connection release, such as when the mobile device 116 is switched or transitioned into idle mode (e.g., LTE_IDLE) or stand-by mode, the base station 102 can delete or release the UE dynamic capability and/or UE semi-static capability associated with the mobile device 116. While in idle mode, the mobile device 116 can still be in limited communication with the base station 102 with regard to certain procedures, such as certain update procedures, for example. In another aspect, when the connection is released, the core network can delete or release the UE dynamic capability of the mobile device 116, as desired, as the UE dynamic capability of the mobile device 116 is no longer being utilized by the core network and/or is no longer valid. As a result, the portion of the data store (e.g., memory) of the core network that contained such UE dynamic capability can be available for other uses. The core network can continue to store the UE semi-static capability associated with the mobile device 116, which can be utilized if and when a connection (e.g., subsequent connection) is initiated with regard to the mobile device 116. This can facilitate efficiently establishing the connection, as, for example, depending on the initiated service (e.g., paging), the core network may have more knowledge regarding the initiated service and can utilize the stored UE semi-static capability to facilitate selecting the desired UE class for the communication, without having to use additional signaling of the mobile device 116, such as, to have the mobile device 116 again provide its UE semi-static capability to the core network.

In another aspect, during a subsequent connection related to the mobile device 116, such as where the mobile device 116 is initiating the service (e.g. UE originated call), the mobile device 116 optionally can select and present (e.g., transmit) a desired UE dynamic capability (e.g., preferred UE class) to the base station 102, which can store the presented UE dynamic capability and can transmit the presented UE dynamic capability to the core network. Based at least in part on predefined selection criteria, the core network and/or base station 102 can facilitate selecting the UE dynamic capability to be used by the mobile device 116, which can be the presented UE dynamic capability or a disparate UE dynamic capability selected from the stored semi-static capability, and information related to the selected UE dynamic capability can be transmitted to the mobile device 116, so that the mobile device 116 can be configured for communication based at least in part on the selected UE dynamic capability.

In yet another aspect, when the mobile device 116 is turned off or is otherwise no longer in the network, the core network can delete or release the UE semi-static capability and/or UE dynamic capability of the mobile device 116 that is/are stored in the core network.

With reference to FIG. 2, illustrated is a system 200 that can facilitate communication associated with a mobile device within a wireless communication environment in accordance with an aspect of the disclosed subject matter. System 200 can include a base station 102 that can communicate with one or more mobile devices, such as mobile device 116. It is to be appreciated and understood that only one mobile device is depicted in FIG. 2 for clarity and brevity. Moreover, base station 102 can communicate with another base station(s) and/or any disparate devices (e.g., servers) (not shown) that can perform functions such as, for example, authentication, authorization, etc. The base station 102 and mobile device 116 each can be respectively the same or similar as, and/or can comprise respectively the same or similar functionality as, respective components, such as more fully described herein, for example, with regard to system 100.

The mobile device 116 can be communicatively connected (e.g., wirelessly connected) with the base station 102, where the connection can comprise a data channel and a control channel. The data channel can facilitate transmission of data between the mobile device 116 and the base station 102, and the control channel can facilitate the transmission of control information between the mobile device and the base station 102. In one aspect, the mobile device 116 can transmit UE capability information, including UE dynamic capability and UE semi-static capability, associated with the mobile device 116 to the base station 102, and the UE capability information can be stored by the base station 102. For instance, the UE capability of the mobile device can be transmitted to the base station 102 as part of, in relation to, a connection request message to request that the mobile device 116 be connected to the base station 102 and core network 202.

In another aspect, the base station 102 can be communicatively connected (e.g., wirelessly connected) to a core network 202 (e.g., evolved packet core) that can facilitate communication related to the mobile device 116. The base station 102 can transmit the UE capability information to the core network 202, for example, as part of or in relation to the connection request message. In one aspect, the core network 202 can include a capability manager 204 that can facilitate managing (e.g., controlling) information, such as UE capability of a mobile device 116, in order to facilitate communications related to the mobile device 116. The core network 202 also can include a capability identifier 206 that can analyze and/or evaluate received UE capability information and can identify respective types of UE capability information, such as, for example, UE dynamic capability information and UE semi-static capability information, based at least in part on predefined identification criteria. For example, to facilitate identification of different types of UE capability information by the capability identifier 206, the identification criteria can include analyzing where in the received UE capability information a particular piece of UE capability information is placed, tag information associated with a particular piece of UE capability information, and/or other analyses can be performed, to identify respective pieces of UE capability information.

In accordance with one embodiment, the core network 202 can contain a data store 208 that can store the UE capability information, where, as desired, the UE capability information can be stored in the data store 208 such that the UE dynamic capability information and UE semi-static capability information associated with a mobile device(s) 116 can be stored, maintained, and/or managed, respectively. In accordance with an embodiment, the data store 208 can store and maintain the UE semi-static capability information, and only store received UE dynamic capability information for a period of time that is long enough to facilitate selecting a desired UE dynamic capability for the mobile device 116, and can delete or release the received UE dynamic capability information, as desired, after the UE dynamic capability is selected by the selector 210, where the base station 102 can store the selected UE dynamic capability until the connection is released. Optionally, the UE dynamic capability information can be stored in the base station 102 and does not have to be provided to and/or stored in the core network 202, which can facilitate further improving efficiency of the core network (e.g., data store 208 can be utilized more efficiently, reduced transmission of data to the core network 202, etc.).

In another embodiment, the data store 208 can store and maintain the received semi-static capability information and received UE dynamic capability information to facilitate selecting a desired UE dynamic capability for the mobile device 116, and the data store 208 can maintain and store the UE semi-static capability information and UE dynamic capability information during the connection. The UE dynamic capability information of the mobile device 116 can be deleted or released from the data store 208, as desired, when the connection is released (e.g., mobile device 116 enters an idle or stand-by mode). When a connection is released, the UE semi-static capability information can continue to be maintained and stored in the data store 208 until the mobile device 116 is turned off or otherwise is no longer in the network, where, at such point, the UE semi-static capability information of the mobile device 116 can be deleted or released.

In one aspect, the data store 208 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 208 is intended to comprise, without being limited to, these and any other suitable types of memory.

In yet another aspect, the core network 202 can comprise a selector 210 that can select a UE dynamic capability for a mobile device 116. The selector 210 can select UE dynamic capability for a mobile device 116 with regard to communication(s) by the mobile device 116 in the network based at least in part on predefined selection criteria. For instance, the selector 210 can evaluate received UE capability information, such as UE semi-static capability, information and/or UE dynamic capability information, and information related to the type of communication to be performed in relation to the mobile device 116, and can select a desired UE dynamic capability (e.g. UE class) based at least in part on predefined selection criteria. It is to be appreciated and understood that, as desired, the selector 210 of the core component 202, or the base station 102, can select the UE dynamic capability during a connection.

In one embodiment, the capability manager 204 can facilitate transmitting the UE semi-static capability information and/or selected UE dynamic capability (e.g., UE dynamic capability information) to the base station 102, and the base station 102 can transmit the selected UE dynamic capability to the mobile device 116, which can be configured to communicate based at least in part on the selected UE dynamic capability.

As an example of managing UE capability to facilitate improved communications associated with a mobile device (e.g., 116), during an initial connection of the mobile device to the base station 102 and core network 202, the core network 202 can receive and store UE dynamic capability and UE semi-static capability associated with the mobile device. When the connection is released, such as when the mobile device is transitioned to an idle mode, the UE dynamic capability associated with the mobile device can be deleted or released by the core network 202, and the core network 202 can continue to store the semi-static capability associated with the mobile device. During a subsequent connection of the mobile device to the base station 102 and core network 202, depending in part on the type of communication, the core network 202 may have more knowledge regarding the initiated service (e.g., voice call, best effort data communication), and as such, it can be beneficial for the core network 202 or base station 102 to select and signal a particular UE dynamic capability (e.g., UE class) so that an additional signaling related to UE dynamic capability after the connection setup procedure can be avoided. For instance, the core network 202 or base station 102 can receive a request to initiate a service, such as an incoming page to the mobile device, and the core network 202 can have knowledge regarding the type of service (e.g., communication) and other characteristics (e.g., UL-centric service, DL-centric service, etc.) associated with the initiated service. As the core network 202 has retained the UE semi-static capability of the mobile device from the previous connection, the core network 202 can access such UE semi-static capability and can provide the UE semi-static capability to the base station 102. The base station 102 or core network 202 can select a desired (e.g., optimal) UE dynamic capability from the UE semi-static capability without having to receive additional signaling of UE capability from the mobile device.

As another example, during a subsequent connection of the mobile device to the base station 102 and core network 202, the mobile device may have more knowledge regarding the initiated service. For instance, the initiated service can be a phone call originated by the mobile device, where the mobile device can have more knowledge than the base station 102 or core network 202 regarding whether the initiated service is DL focused or UL focused. The base station 102 and core network 202 will not have such knowledge, for example, if the mobile device uses a generic IP access bearer. In one aspect, the mobile device has the option of transmitting a preferred UE dynamic capability to the base station 102. For example, this function can be used by the mobile device to distinguish the UE dynamic capability (e.g., UE class) to use, depending in part on whether the mobile device is separately receiving evolved multimedia broadcast and multicast service (E-MBMS) or not, where, as desired, the mobile device can employ a lower UE class (e.g., lower bit rate capability) for the initiated service, because of the processing power utilized by the mobile device by such broadcast reception. As yet another example, if the service initiated by the mobile device is web browsing, the mobile device can determine that a DL-centric UE dynamic capability (e.g., 55 Mbps for DL and 5 Mbps for UL) is preferred (e.g., optimal) and can transmit the preferred DL-centric UE dynamic capability to the base station 102 for consideration by the base station 102 when selecting a UE dynamic capability for the connection and communication associated with the mobile device. In accordance with another aspect, the UE semi-static capability of the mobile device does not have to be transmitted to the base station 102 and core network 202 again, as the core network 202 has such UE semi-static capability stored in data store 208. The base station 102 or core network 202 can analyze the received UE dynamic capability, if any, as well as other information (e.g., UE semi-static capability, type of communication, whether the communication is UL focused or DL focused, etc.) and can select a desired (e.g., optimal) UE dynamic capability to be utilized by the mobile device during the initiated service (e.g., communication) based at least in part on predefined selection criteria.

The subject innovation can provide improved efficiency related to connection of the mobile device to a base station and core network in a wireless communication environment and improved communication associated with the mobile device in such environment, as compared to conventional communication systems, methods, and devices. For example, conventionally, a network does not distinguish between UE dynamic capability and UE semi-static capability of a mobile device, and does not retain UE semi-static capability of a mobile device when the mobile device is in idle mode. The subject innovation can identify and separately control UE dynamic capability and UE semi-static capability associated with a mobile device, and can maintain storage of UE semi-static capability of a mobile device after a connection associated with the mobile device is released, such as when the mobile device transitions to idle mode. This can result in improved efficiency, as, for example, during a subsequent connection associated with the mobile device, such as when the mobile device transitions to an active mode and a connection of the mobile device to the base station and core network is being established, there can be a reduction in the amount of signaling (e.g., related to UE capability of the mobile device) and the amount of time to establish such connection.

Figure 3:
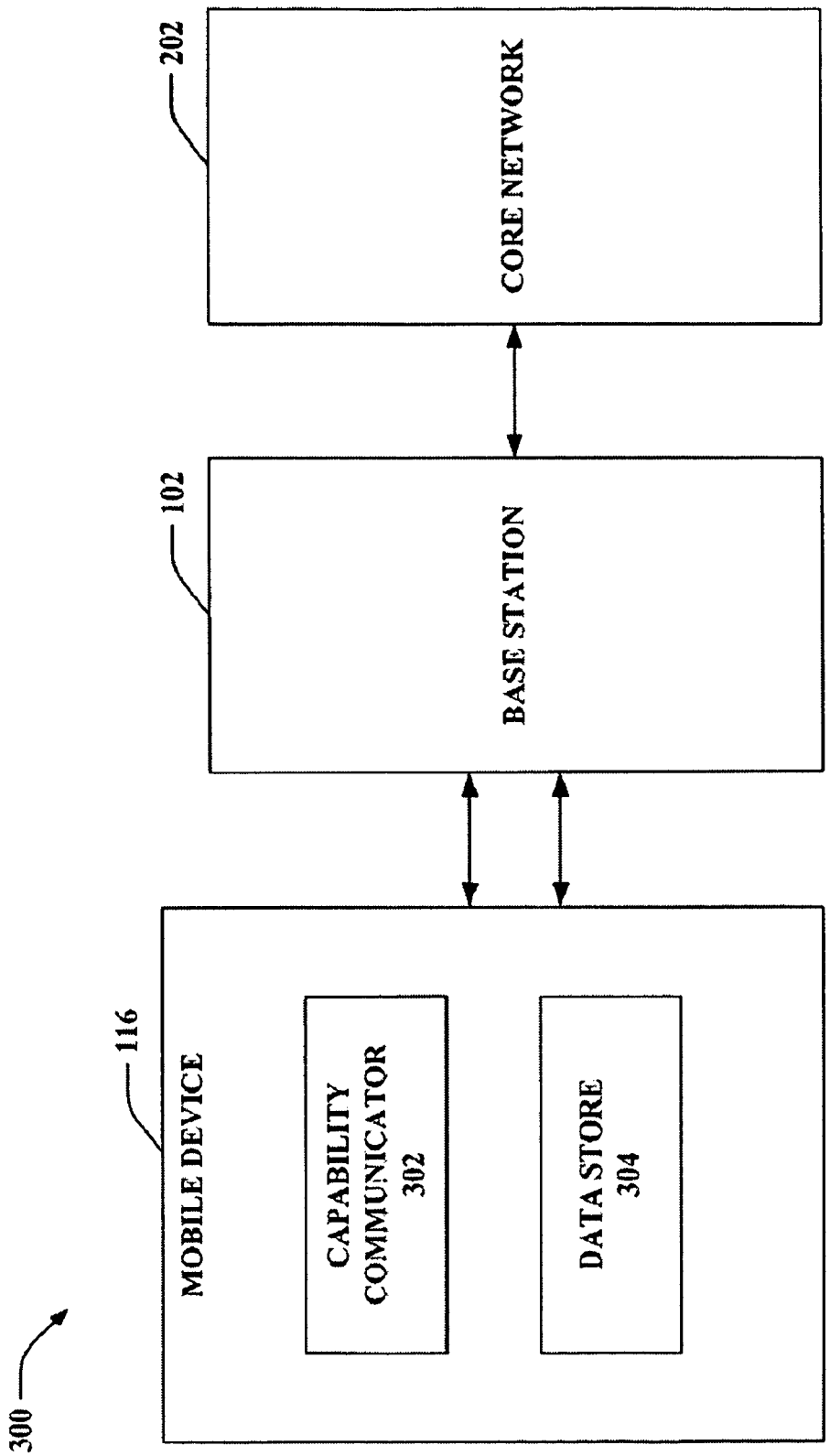
FIG. 3 is a depiction of an example system that can facilitate communications associated with a mobile device in a wireless communication environment.

Referring to FIG. 3, depicted is a system 300 that can facilitate communications associated with a mobile device in a wireless communication environment. System 300 can include a base station 102 that can communicate with one or more mobile devices, such as mobile device 116. It is to be appreciated and understood that only one mobile device is depicted in FIG. 3 for clarity and brevity. Also, base station 102 can communicate with another base station(s) and/or any disparate devices (e.g., servers) (not shown) that can perform functions such as, for example, authentication, authorization, etc. In another aspect, the base station 102 can be communicatively connected (e.g., wirelessly connected) to a core network 202 that can facilitate communication related to the mobile device 116 in a wireless communication environment. The base station 102, mobile device 116, and core network 202 each can be respectively the same or similar as and/or can comprise respectively the same or similar functionality as, respective components, such as more fully described herein, for example, with regard to system 100 and/or system 200.

Mobile device 116 can be communicatively connected (e.g., wirelessly connected) with the base station 102, where the connection can comprise a data channel and a control channel, for example. In one aspect, the mobile device 116 can transmit UE capability information, including UE dynamic capability and UE semi-static capability, of the mobile device 116 to the base station 102, which can be stored by the base station 102. The base station 102 can be communicatively connected to the core network 202, and the base station 102 can transmit the UE capability information to the core network 202.

In one aspect, the mobile device 116 can include a capability communicator 302 that can communicate UE capability information, such as UE semi-static capability information and/or UE dynamic capability information, for the mobile device 116 to the base station 102 to facilitate determining and/or selecting a UE dynamic capability (e.g., UE class) to be employed during a particular connection of the mobile device 116 to the base station 102 and core network 202 and/or communication associated with the mobile device 116. For instance, during an initial connection set-up, the capability communicator 302 can transmit UE semi-static capability information and UE dynamic capability information to the base station 102. During a subsequent connection, such as where the initial connection is released and the mobile device 116 is in idle mode, for example, the base station 102 and/or core network 202 already can have stored respectively therein UE semi-static capability information of the mobile device 116. In such instance, if the communication is originated by the mobile device 116, the capability communicator 302 optionally can select and transmit UE dynamic capability information to the bast station 102. For example, for a connection or communication originated by the mobile device 116, the mobile device 116 can have knowledge regarding the type of communication (e.g., call, message, . . . ) to be performed and/or can have knowledge regarding whether the communication is UL centric or DL centric. The capability communicator 302 can select and transmit a desired (e.g. preferred) UE dynamic capability of the mobile device 116 based at least in part on predefined selection criteria, such as type of communication and/or whether the communication is UL centric or DL centric. The mobile device 116 can present (e.g., transmit) the desired UE dynamic capability to the base station 102 to facilitate setting up a connection and communication associated with the mobile device 116. The base station 102 can transmit the UE capability information received from the mobile device 116 to the core network 202.

In another aspect, the mobile device 116 can comprise a data store 304 that can store information, such as UE capability information, related to the mobile device 116 and communication in the wireless communication environment. When establishing a connection with a base station 102, the mobile device 116 can retrieve UE capability information (e.g., UE dynamic capability information, UE semi-static capability information) from the data store 304 and can provide the UE capability information to the base station 102 to facilitate connection and/or communication by the mobile device 116 in the network.

In accordance with an aspect, the data store 304 described herein can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). The data store 304 is intended to comprise, without being limited to, these and any other suitable types of memory.

Figure 4:
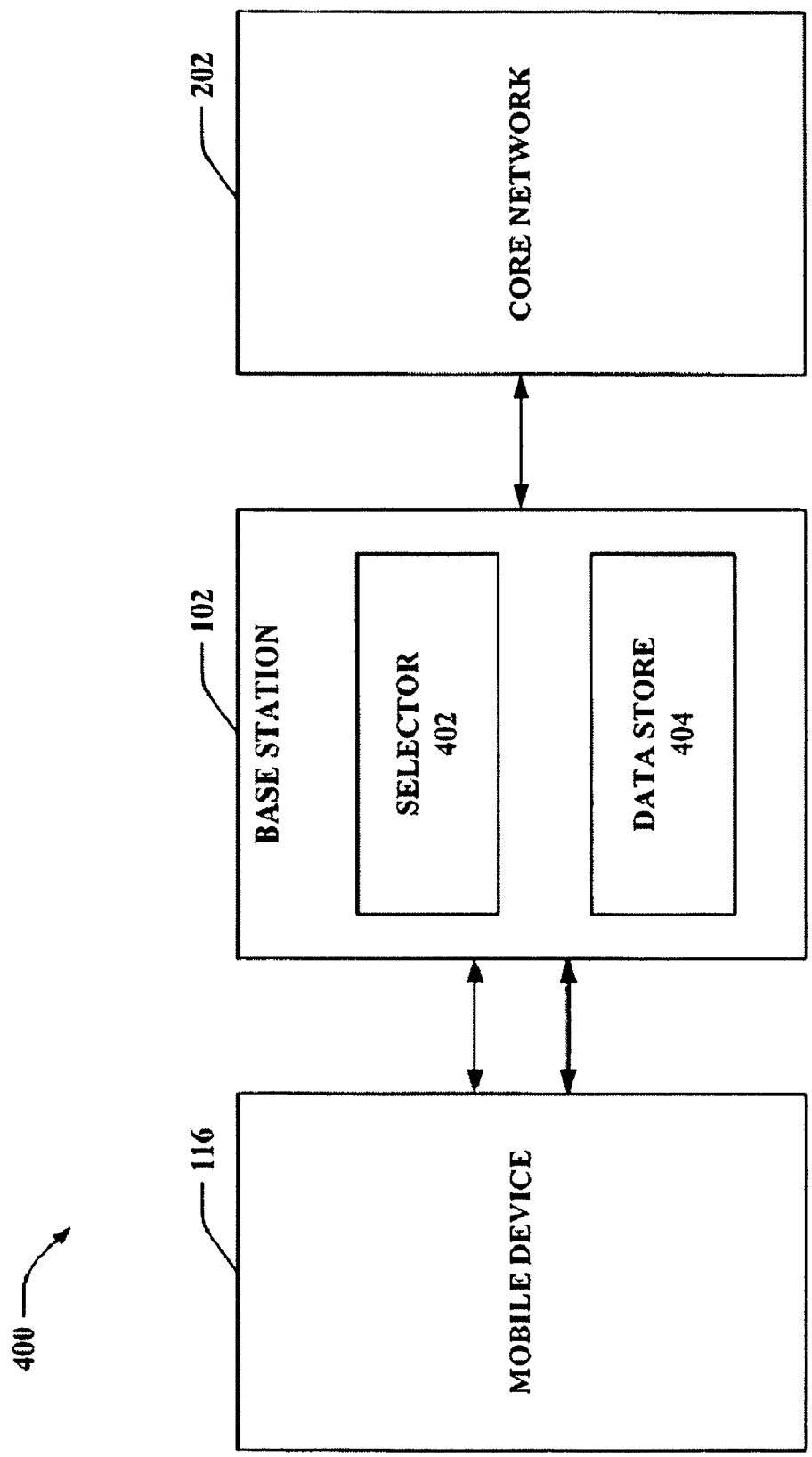
FIG. 4 is an illustration of another example system that can facilitate communication associated with a mobile device within a wireless communication environment.

Now referring to FIG. 4, illustrated is a system 400 that can facilitate communication associated with a mobile device within a wireless communication environment. System 400 includes a base station 102 that can communicate with one or more mobile devices, such as mobile device 116. It is to be appreciated and understood that only one mobile device is depicted in FIG. 4 for clarity and brevity. Also, it is to be appreciated and understood that the base station 102 can communicate with another base station(s) and/or any disparate devices (e.g. servers) (not shown) that can perform functions such as, for example, authentication, authorization, etc. System 400 also can include a core network 202 that can be communicatively connected (e.g., wirelessly connected) to the base station 102 to facilitate communication related to the mobile device 116. The base station 102, mobile device 116, and core network 202 each can be respectively the same or similar as, and/or can comprise respectively the same or similar functionality as, respective components, such as more fully described herein, for example, with regard to system 100, system 200, and/or system 300.

In one aspect, the base station 102 can include a selector 402 that can select a UE dynamic capability to be utilized by a mobile device 116 during a connection and/or communication associated with the mobile device 116. For example, the selector 402 can facilitate evaluating and/or comparing information, such as UE capability information of a mobile device 116, which can be received from the mobile device 116 and/or the core network 202. Based at least in part on received UE capability information, the selector 402 can select a UE dynamic capability to be utilized by the mobile device 116 during a connection and/or communication associated with the mobile device 116. The selected UE dynamic capability information can be transmitted to the mobile device 116 and the mobile device 116 can utilize the selected UE dynamic capability information to facilitate selecting and utilizing the desired UE dynamic capability during the connection and/or communication.

For example, the mobile device 116 can provide its UE capability to the base station 102, which can provide the UE capability to the core network 202. When the connection is set up, the core network 202 can transmit the UE semi-static capability (e.g., a set of available UE classes associated with the mobile device 116) to the base station 102, and the selector 402 can select a desired UE dynamic capability (e.g., preferred UE class) from the UE semi-static capability based at least in part on predefined selection criteria. The base station 102 can transmit the selected UE dynamic capability to the mobile device 116 and the mobile device 116 can be configured to communicate utilizing the selected UE dynamic capability.

In accordance with an aspect, the base station 102 also can include a data store 404 that can store information, including UE capability information associated with a mobile device 116, related to communications in the wireless communication environment. The data store 404 can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 404 is intended to comprise, without being limited to, these and any other suitable types of memory.

In accordance with another aspect, the UE capability information of the mobile device 116 can be stored in data store 404 while the connection is maintained with the mobile device 116. If and when the connection with the mobile device 116 is released, such as when the mobile device 116 is switched into idle mode or stand-by mode, is switched off, or is otherwise is no longer in the network, the UE capability information for the mobile device can be deleted or released from the data store 404, as desired.

Figure 5:
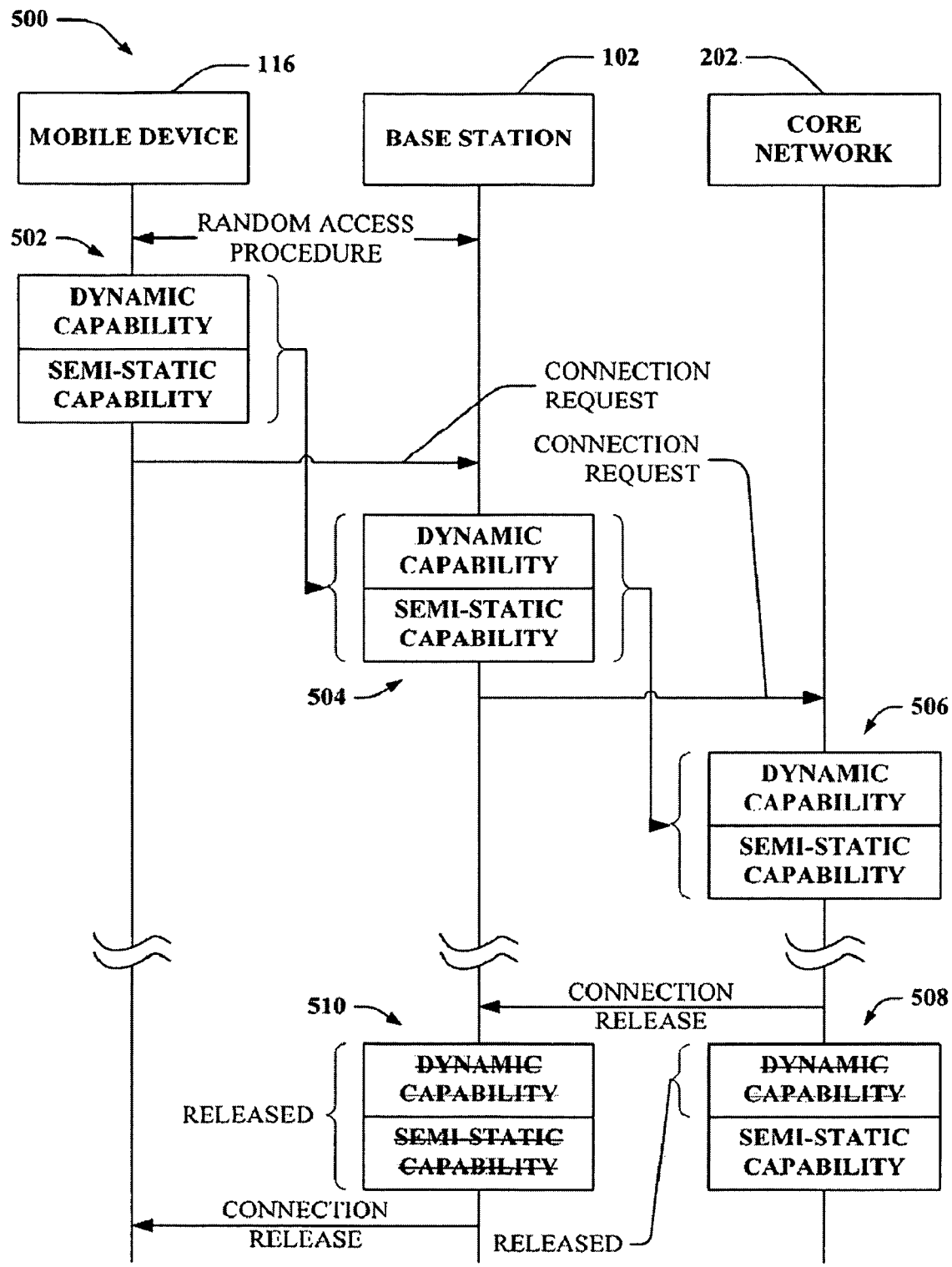
FIG. 5 is an illustration of an initial connection setup and connection release associated with a mobile device in a wireless communication environment in accordance with an aspect of the disclosed subject matter.

FIG. 5 is a diagram 500 that illustrates an initial connection setup and connection release associated with a mobile device in a wireless communication environment in accordance with an aspect of the disclosed subject matter. Diagram 500 illustrates a mobile device 116, a base station 102, and core network 202 in a wireless communication environment. The mobile device 116, base station 102, and core network 202 each can be respectively the same or similar as, and/or can comprise respectively the same or similar functionality as, respective components, such as more fully described herein, for example, with regard to system 100, system 200, system 300, and/or system 400.

During an initial connection (e.g., attach) setup to establish a communication connection between the mobile device 116 and the base station 102 (and core network 202), a connection request can be transmitted by the mobile device 116 to the base station 102, for example. As part of the connection request, or in a separate message, as desired, the mobile device 116 can transmit its UE capability 502, including UE semi-static capability and UE dynamic capability, to the base station 102, where the base station 102 can store the UE capability 504 associated with the mobile device 116. The base station 102 also can forward (e.g., transmit) the connection request and associated UE capability to the core network 202, and the core network 202 can store the UE capability 506 associated with the mobile device 116. Based at least in part on the UE capability information received from the mobile device 116 and/or information received from the core network 202, the base station 102 can select a desired UE dynamic capability, and the selected UE dynamic capability can be transmitted to the mobile device 116, and the mobile device 116 can be configured to communicate using the selected UE dynamic capability.

When the connection is no longer desired, such as when the communication is completed and the mobile device is switched into idle mode or stand-by node, for example, the connection of the mobile device 116 with the base station 102 and core network 202 can be released. The core network 202 can delete or release the UE dynamic capability of the mobile device 116, but can continue to store the UE semi-static capability information of the mobile device 116, as depicted at 508. Deleting the UE dynamic capability of the mobile device 116 can make available the portion of the data store 208 of the core network 202 that was utilized to store the UE dynamic capability, as it is no longer necessary to store such information because the connection is released. Maintaining the semi-static capability of the mobile device 116 can be desirable, as the UE semi-static capability can be utilized during a subsequent connection, if any, of the mobile device 116, which can facilitate reducing the amount of signaling utilized to establish a subsequent connection of the mobile device 116 to the base station 102 and core network 202.

During a connection release, the base station 102 can delete and release the UE capability 510, including the UE dynamic capability and UE semi-static capability, of the mobile device 116, which can make that portion of the data store 404 of the base station 102 available for other uses.

Figure 6:
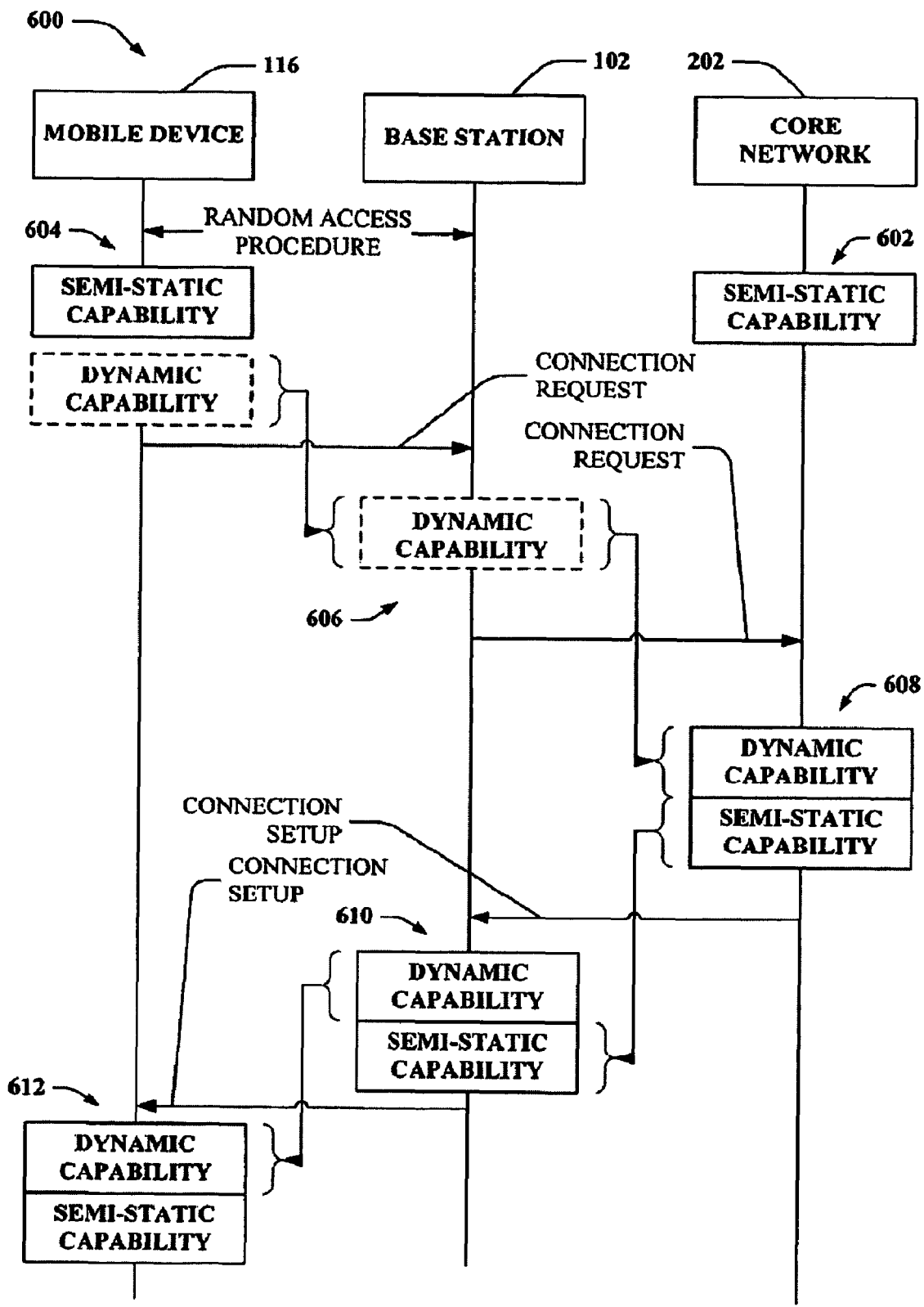
FIG. 6 is a depiction of a subsequent connection setup associated with a mobile device in a wireless communication environment in accordance with an aspect of the disclosed subject matter.

Turning to FIG. 6, is a diagram 600 that depicts a subsequent connection setup associated with a mobile device in a wireless communication environment in accordance with an aspect of the disclosed subject matter. Diagram 600 illustrates a mobile device 116, a base station 102, and core network 202 in a wireless communication environment. The mobile device 116, base station 102, and core network 202 each can be respectively the same or similar as, and/or can comprise respectively the same or similar functionality as, respective components, such as more fully described herein, for example, with regard to system 100, system 200, system 300, and/or system 400.

During a subsequent connection to establish a communication connection between the mobile device 116 and the base station 102 (and core network 202), a connection request can be transmitted by the mobile device 116 to the base station 102, for example. For example, the mobile device 116 can be switched from an idle mode to an active mode to facilitate receiving and/or sending communications. Since there was a previous connection of the mobile device 116 to the base station 102 and core network 202, the core network 202 can have the UE semi-static capability 602 of the mobile device 116 stored in the data store 208 of the core network 202.

Optionally, as part of the connection request, or in a separate message, as desired, the mobile device 116 can transmit its UE dynamic capability 604 to the base station 102, where the base station 102 can store the UE dynamic capability 606 associated with the mobile device 116. For instance, if the mobile device 116 is originating the communication (e.g., UE originated call), the mobile device 116 can have knowledge regarding the type of communication and/or whether the communication will be UL centric or DL centric, and the mobile device 116 optionally can present (e.g., transmit) a desired (e.g. preferred) UE dynamic capability to the base station 102 to facilitate selection of an optimal UE dynamic capability to facilitate improved communication associated with, the mobile device 116. As desired, the base station 102 can provide the UE dynamic capability 608 to the core network 202.

The UE semi-static capability, which was stored in the core network 202 (e.g., UE semi-static Capability 602), can be provided to the base station 102, where the base station 102 can select (or the core network 202 already could have selected) the UE dynamic capability to be utilized by the mobile device 116 during the connection and communication, such as depicted at 610. The base station 102 can transmit a signal to the mobile device 116 that can indicate that the mobile device 116 is to utilize the selected UE dynamic capability 612 during the connection and communication associated with die mobile device 116.

In certain instances, such as when the core network 202 has knowledge (or more knowledge than the mobile device 116) with regard to an initiated service, the core network 202 can select a desirable (e.g., optimal) UE dynamic capability from the stored UE semi-static capability associated with the mobile device 116 based at least in part on predefined selection criteria, and can signal to the base station 102 the desired UE dynamic capability to be utilized during the connection and communication, and the base station 102 can signal to the mobile device 116 the desired, UE dynamic capability 612 to be utilized during the connection and communication.

Figure 7:
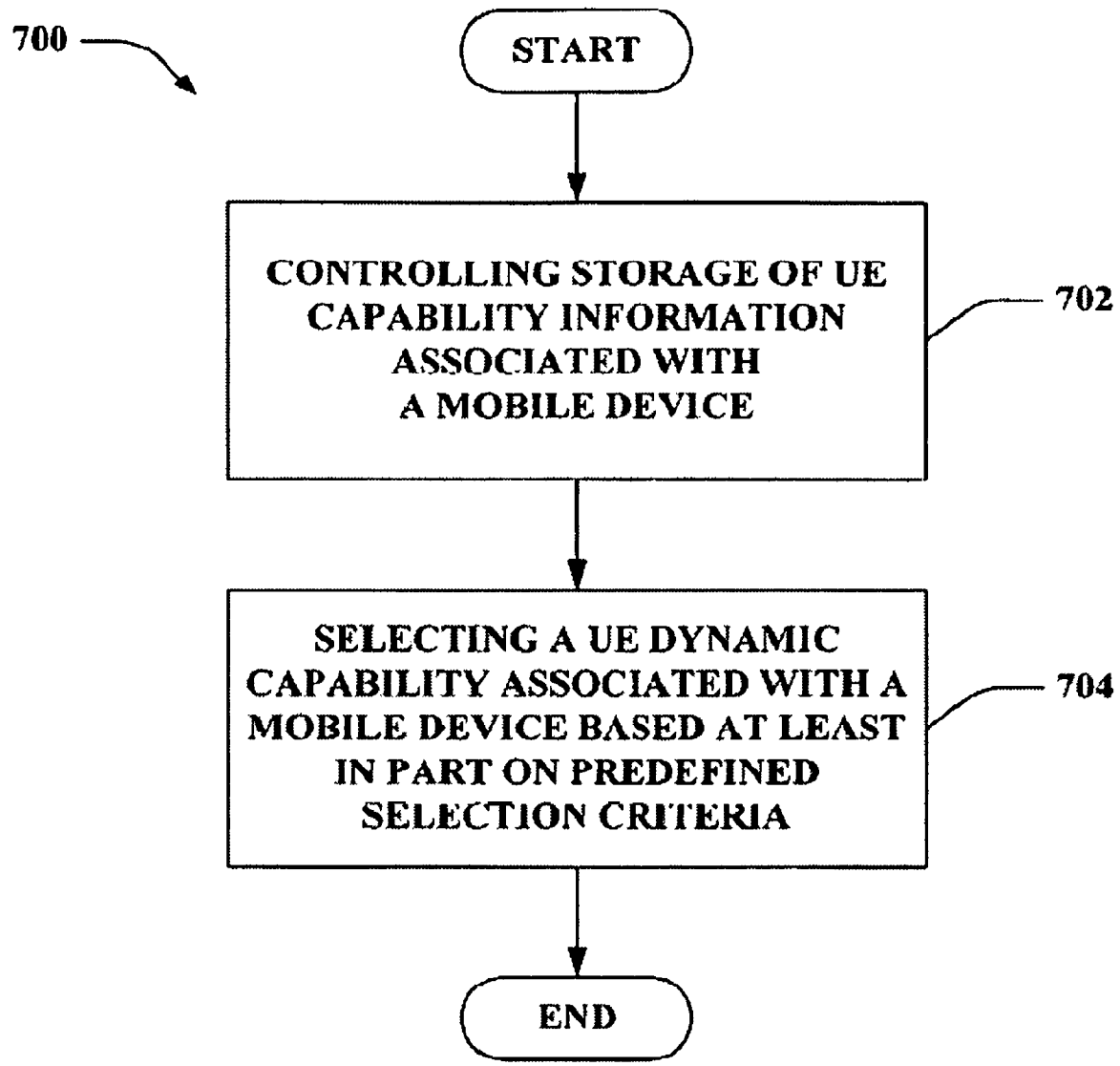
FIG. 7 is an illustration of an example methodology that can facilitate communications associated with a mobile device in a wireless communication system.
Figure 8:
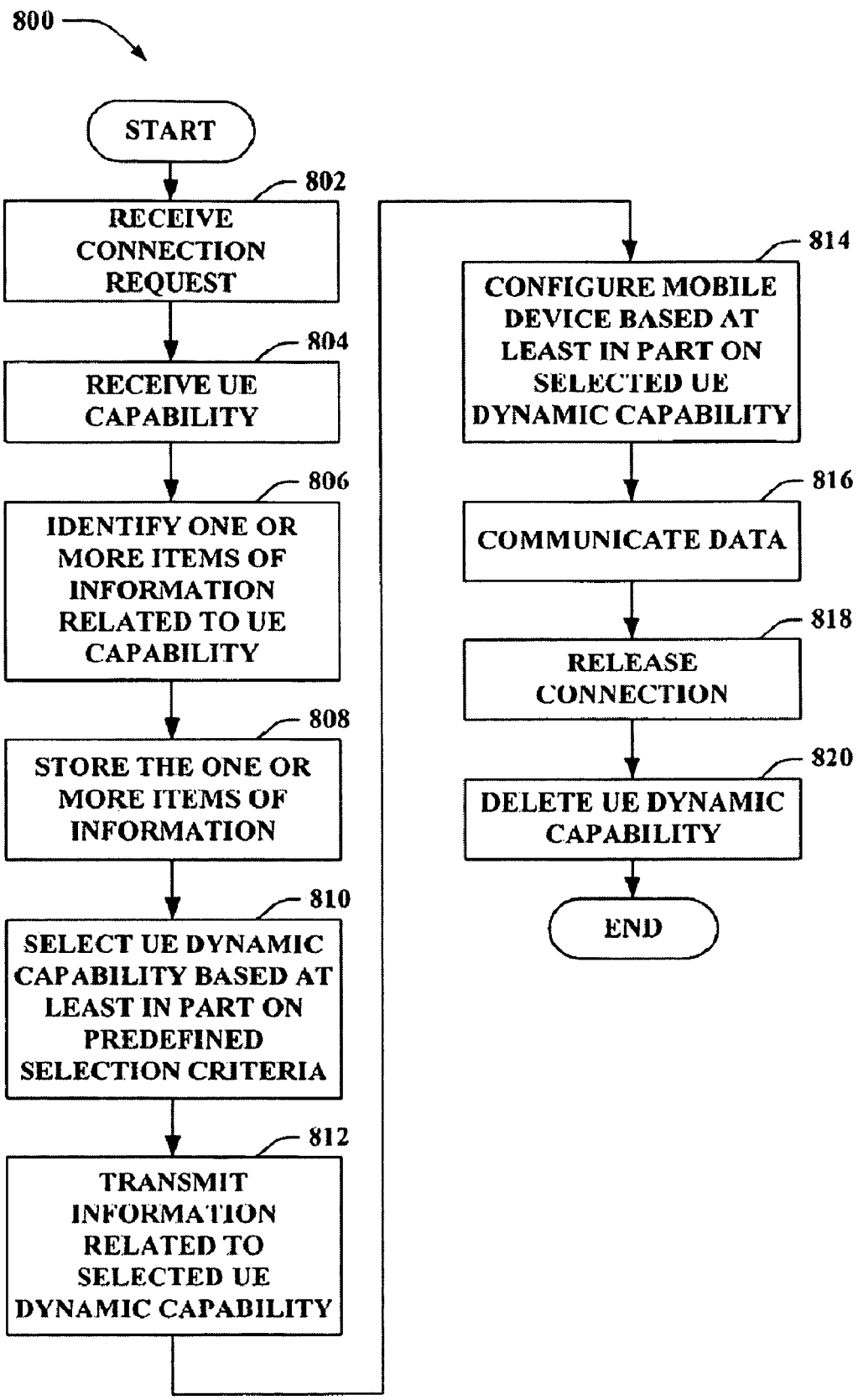
FIG. 8 is a depiction of an example methodology that can facilitate controlling UE capability information of a mobile device to facilitate communications associated with a mobile device in a wireless communication system.
Figure 9:
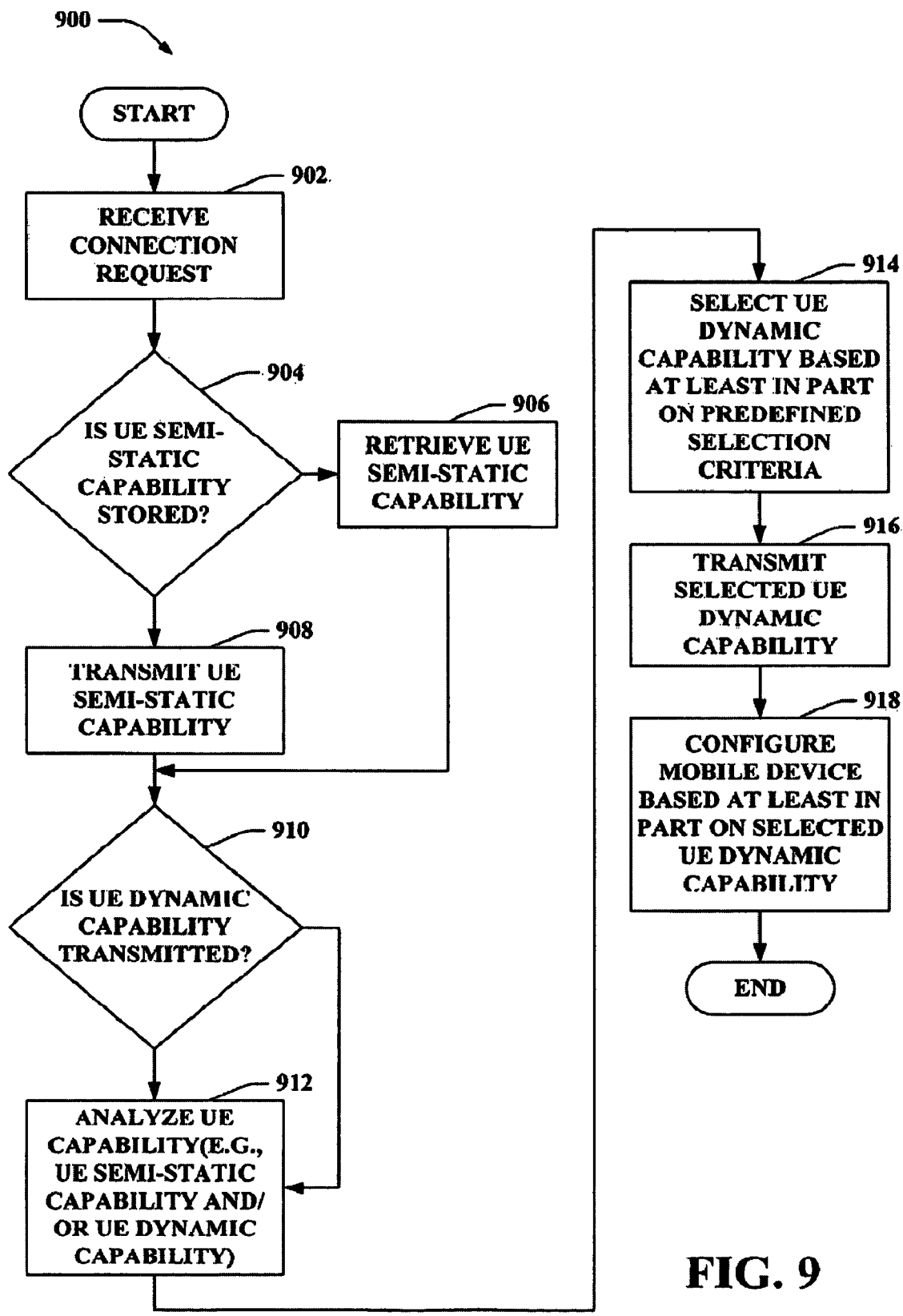
FIG. 9 is an illustration of an example methodology that can facilitate establishing a connection associated with a mobile device to facilitate communication in a wireless communication system.

Referring to FIGS. 7-9, methodologies relating to managing UE capability information (e.g., UE dynamic capability, UE semi-static capability) respectively associated with mobile devices (e.g., 116) to facilitate efficient connection of mobile devices to a network (e.g., base station 102, core network 202) and communication associated with mobile devices in the network are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 7, illustrated is a methodology 700 that can facilitate communications associated with a mobile device in a wireless communication system. At 702, controlling storage of UE capability information associated with a mobile device (e.g., 116). In one aspect, a core network 202 can receive and store UE capability, such as UE dynamic capability and UE semi-static capability, associated with a mobile device during an initial connection of a mobile device to a base station 102 and the core network 202. In another aspect, the core network 202 can identify or classify received items of information as UE dynamic capability or UE semi-static capability associated with a mobile device to facilitate controlling storage of the UE dynamic capability and UE semi-static capability of a mobile device. While the connection between the mobile device and the base station 102 and core outwork 202 is active, the core network 202 can maintain storage of the UE dynamic capability and UE semi-static capability of the mobile device. If and when such connection is released, which can occur, for example, when the mobile device is transitioned or switched to an idle mode or stand-by mode, the core network 202 can delete or release the UE dynamic capability associated with the mobile device, but can continue to store the UE semi-static capability of the mobile device, where the stored UE semi-static capability can be utilized, as desired, to facilitate establishing a subsequent connection of the mobile device to the base station 102 and core network 202 to facilitate subsequent communications associated with the mobile device in the network.

At 704, UE dynamic capability associated with a mobile device can be selected based at least in part on predefined selection criteria. For instance, the core network 202 or base station 102 utilizing UE capability associated with the mobile device can select a desired (e.g., optimal) UE dynamic capability to be utilized by the mobile device during the connection and communication, where the UE dynamic capability can be selected based at least in part on predefined selection criteria. The UE capability can comprise UE dynamic capability, if any, received by the base station 102 from the mobile device during the connection setup, where UE dynamic capability can be provided by the mobile device to the base station 102 during an initial connection or UE dynamic capability optionally can be provided by the mobile device to the base station 102 during a subsequent connection of the mobile device to the base station 102 and core network 202. The UE capability can comprise UE semi-static capability, which can be received by the base station 102 from the mobile device during an initial connection, or can be retrieved from data store 208 in the core network 202 and provided to the base station 102 by the core network 202 during a subsequent connection associated with the mobile device. The base station 102 or core network 202 can select a desired UE dynamic capability, which can be the UE dynamic capability indicated by the mobile device as preferred or can be a disparate UE dynamic capability that can be selected from the UE semi-static capability (e.g., available UE classes) associated with the mobile device.

Turning to FIG. 8, illustrated is a methodology 800 that can facilitate controlling UE capability information of a mobile device to facilitate communications associated with a mobile device in a wireless communication system. At 802, a connection request can be received. In one aspect, a connection request associated with a mobile device (e.g., 116) can be received by the core network (e.g., 202). For example, the mobile device can transmit a connection request to a base station (e.g., 102), which can transmit the connection request to the core network to facilitate establishing a connection of the mobile device to the base station and core network to facilitate communication associated with the mobile device in the network. At 804, UE capability information associated with a mobile device can be received. For example, UE capability information, such as UE dynamic capability information and UE semi-static capability information, associated with the mobile device can be received by the core network 202 via the base station. At 806, one or more items of information related to UE capability can be identified. In one aspect, the core network 202 can include a capability identifier (e.g., 206) that can analyze received information (e.g., UE capability information) associated with a mobile device(s) and, based at least in part on such analysis, can identify and/or classify respective one or more items of information, respectively, as UE semi-static capability information or UE dynamic capability information based at least in part on pre-defined identification criteria. At 808, the one or more items of identified information can be stored. For example, each of the one or more items respectively identified as UE dynamic capability information or UE semi-static capability information associated with a mobile device can be stored in the core network 202 (e.g., in data store 208).

At 810, UE dynamic capability can be selected based at least in part on predefined selection criteria. For instance, the base station or core network can select a UE dynamic capability to be utilized by the mobile device during the connection and communication. At 812, information relating to the selected UE dynamic capability can be transmitted. In one aspect, such UE dynamic capability information can be transmitted by the base station to the mobile device. At 814, the mobile device can be configured based at least in part on the selected UE dynamic capability. In one aspect, the mobile device can receive the information related to the selected UE dynamic capability and such information can be utilized to facilitate configuring the mobile device to facilitate establishing a connection, and communication, between the mobile device and thy base station. At 816, data can be communicated. After the connection is setup between the mobile device and base station in the wireless network, the mobile device can receive and/or transmit data in accordance with the selected UE dynamic capability.

At 818, the connection can be released. In one aspect, when the communication of data is completed, as desired, the connection between the mobile device and base station can be released. For example, the mobile device can be transitioned to an idle mode or stand-by mode, which can result in the connection between the mobile device and base station (and core network) being released. At 820, the UE dynamic capability information can be deleted. For instance, the core network can delete the UE dynamic capability associated with the mobile device when the connected between the mobile device and the base station (and core network) is released to facilitate making additional memory available in the core network. In one aspect, the core network can continue to store the UE semi-static capability associated with the mobile device, which can be utilized to facilitate reducing signaling and time related to establishing a subsequent connection between the mobile device and the base station and core network. In another aspect, if the mobile device is changed to an off state (e.g., turned off), or is otherwise no longer associated with the core network and base station, the core network can delete the UE semi-static capability of the mobile device from its data store 208. In yet another aspect, when the connection between the mobile device and the base station is released, the base station can delete or release the UE dynamic capability and/or UE semi-static capability associated with the mobile device.

Referring to FIG. 9, depicted is a methodology 900 that can facilitate establishing a connection associated with a mobile device to facilitate communication in a wireless communication system. At 902, a connection request can be received. For example, a mobile device (e.g., 116) can transmit a connection request to a base station 102 to facilitate establishing a connection of the mobile device with the base station and core network 202. At 904, a determination can be made as to whether UE semi-static capability associated with the mobile device is stored in the core network 202. For instance, the core network 202 can determine whether UE semi-static capability of the mobile device is stored in its data store 208. The core network 202 can have such UE semi-static capability stored in its data store 208, for example, where the mobile device was previously connected to the base station 102 and core network 202. If UE semi-static capability associated with the mobile device is stored in the data store 208 of the core network 202, at 906, such UE semi-static capability can be retrieved. For instance, the core network 202 can retrieve the UE semi-static capability from its data store 208, and such UE semi-static capability information can be utilized to facilitate selecting a desired UE dynamic capability to be utilized by the mobile device during the connection and communication. At this point, methodology 900 can proceed to reference numeral 910. If, at 904, it is determined that UE semi-static capability associated with the mobile device is not stored in the core network 202, at 908, UE semi-static capability associated with the mobile device can be transmitted. For instance, the mobile device can transmit its UE semi-static capability to the base station 102, which can forward the UE semi-static capability to the core network 202 to facilitate establishing a connection of the mobile device to the base station 102 and core network 202.

At 910, a determination can be made regarding whether UE dynamic capability associated with the mobile device has been transmitted. In one aspect, the mobile device can optionally transmit UE dynamic capability to the base station. For example, in a communication (e.g., phone call) originated by the mobile device, the mobile device can have more knowledge than the base station 102 and core network 202 with regard to the type of communication and/or whether such communication DL centric or UL centric, so the mobile device can select a desired (e.g., optimal) UE dynamic capability for the communication based at least in part on predefined selection criteria, and can transmit the UE dynamic capability to the base station 102. At 912, the UE capability, including the UE semi-static capability and/or UE dynamic capability, of the mobile device can be analyzed. For instance, the base station 102 or core network 202 can analyze the UE capability, such as UE semi-static capability and/or UE dynamic capability, associated with the mobile device to facilitate selecting a desired (e.g., optimal) UE dynamic capability to be utilized by the mobile device during the connection and communication. At 914, UE dynamic capability associated with the mobile device can be selected based at least in part on predefined selection criteria. In one aspect, the base station 102 or core network 202 can select the UE dynamic capability to be utilized by the mobile device for the connection and communication. For example, the base station 102 can select the UE dynamic capability that was provided by the mobile device, if any UE dynamic capability was provided to the base station 102 by the mobile device, or the base station 102 can select an available UE dynamic capability from the UE semi-static capability of the mobile device, based at least in part on predefined selection criteria.

At 916, the selected UE dynamic capability can be transmitted. In one aspect, the base station 102 can transmit the selected UE dynamic capability to the mobile device to be utilized by the mobile device to facilitate communication by the mobile device in the network. At 918, the mobile device can be configured based at least in part on the received selected UE dynamic capability. In one aspect, the mobile device can receive the selected UE dynamic capability from the base station 102, and the mobile device can be configured based at least in part on the selected UE dynamic capability, so that the mobile device can communicate in accordance with the selected UE dynamic capability.

It will be appreciated that, in accordance with one or more aspects described herein, inferences can be made relating to managing UE capability information (e.g., UE dynamic capability, UE semi-static capability) respectively associated with a mobile device(s) (e.g., 116) to facilitate efficient connection of a mobile device(s) to a network (e.g., base station 102, core network 202) and communication associated with the mobile device(s) in the network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making an inference(s) pertaining to selecting a preferred (e.g., optimal) UE dynamic capability to be utilized by a mobile device during a particular connection and/or communication associated with the mobile device in the network. By way of further illustration, an inference(s) can be made related to determining or identifying whether received items of information are UE dynamic capability or UE semi-static capability associated with a mobile device, which can facilitate proper storage and management of the UE dynamic capability and UE semi-static capability associated with a mobile device. It will be appreciated that the foregoing examples are illustrative in nature and are not intended to limit the number of inferences that can be made or the manner in which such inferences are made in conjunction with the various embodiments and/or methods described herein.

Figure 10:
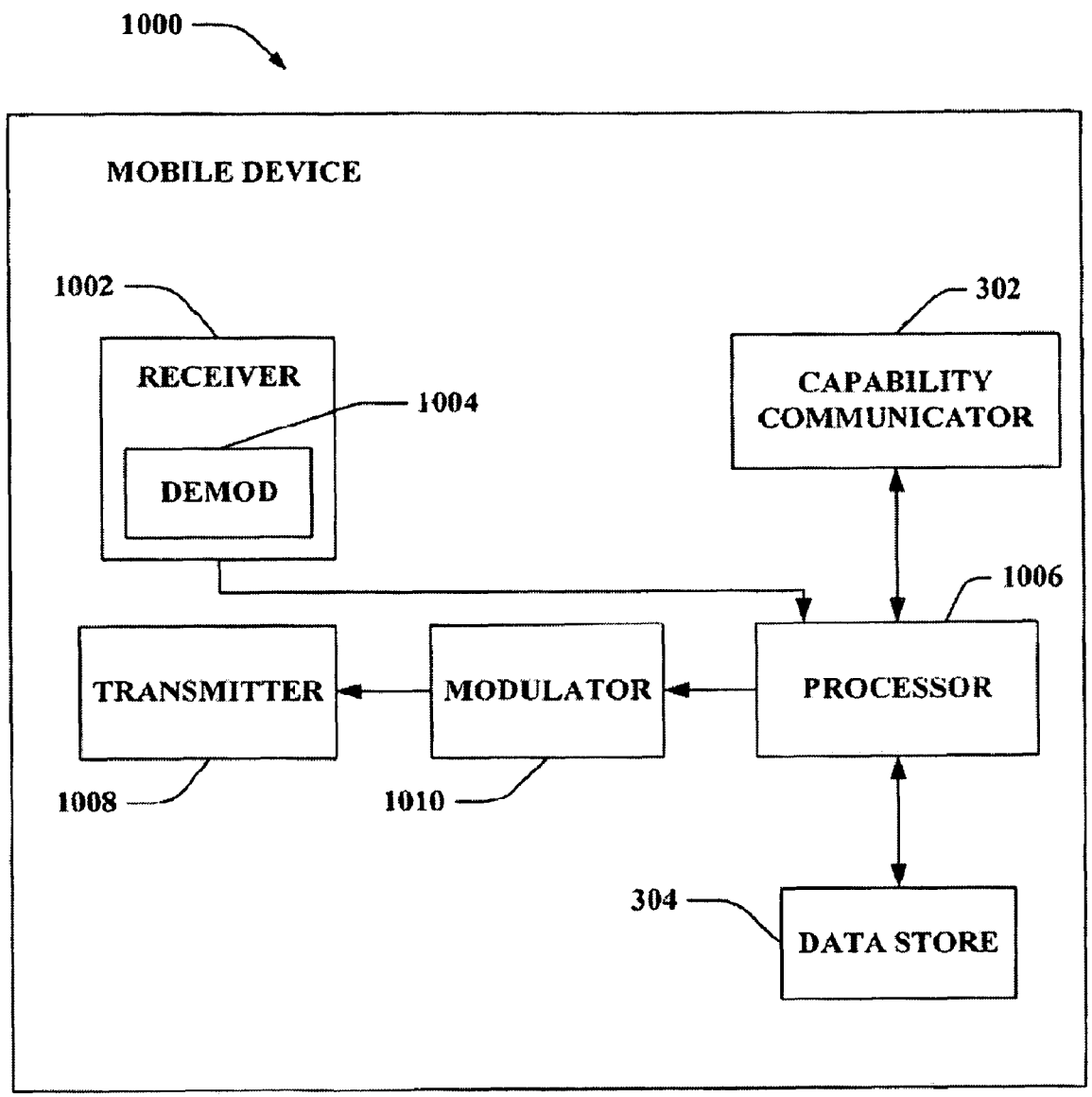
FIG. 10 is an illustration of an example mobile device that can facilitate communications associated with a mobile device in a wireless communication system in accordance with an aspect of the disclosed subject matter.

FIG. 10 is an illustration of a mobile device 1000 that can facilitate communications associated with a mobile device in a wireless communication system in accordance with an aspect of the disclosed subject matter. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1008, a processor that controls one or more components of mobile device 1000, and/or a processor that both analyzes information received by receiver 1002, generates information for transmission by transmitter 1008, and controls one or more components of mobile device 1000. Mobile device 1000 can also comprise a modulator 1010 that can work in conjunction with the transmitter 1008 to facilitate transmitting signals (e.g., data) to, for instance, a base station 102, another mobile device, etc.

The processor 1006 can be connected to a capability communicator 302 that can facilitate select and transmit UE capability of the mobile device 116, including a desired (e.g., preferred) UE dynamic capability associated with the mobile device 116 based at least in part on predefined selection criteria, such as, for examples type of communication and/or whether the communication is UL centric or DL centric. It is to be appreciated and understood that the capability communicator 302 can be the same or similar as, or can comprise the same or similar functionality as, respective components such as more fully described herein, for example, with regard to system 300. It is to be further appreciated and understood that the capability communicator 302 can be a stand-alone unit (as depicted), can be included within the processor 1006, can be incorporated within another component, and/or virtually any suitable combination thereof, as desired.

Mobile device 1000 can additionally comprise data store 304 that can be operatively coupled to processor 1006 and/or capability communicator 302 and can store data to be transmitted, received data, information related to selecting and/or communicating UE capability (e.g., UE dynamic capability), and any other suitable information that can facilitate communication of data associated with the mobile device 116. Data store 304 can additionally store protocols and/or algorithms associated with selecting and/or communicating UE capability (e.g., UE dynamic capability) related to the mobile device 116. It is to be appreciated and understood that the data store 304 can be the same or similar as, or can comprise the same or similar functionality as, respective components such as more fully described herein, for example, with regard to system 300.

Figure 11:
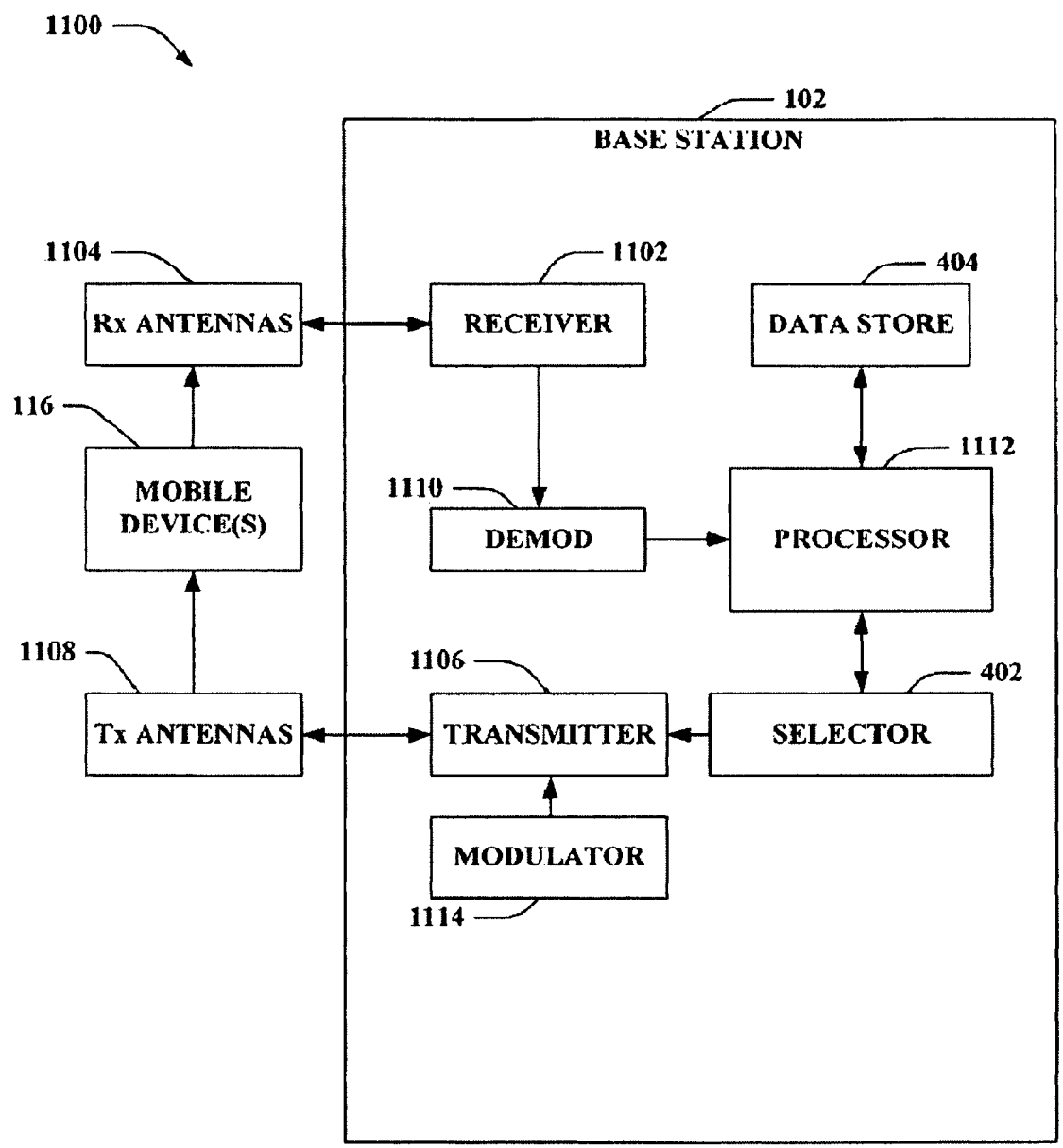
FIG. 11 is a depiction of an example system that can facilitate communications associated with a mobile device in a wireless communication system in accordance with an aspect of the disclosed subject matter.

FIG. 11 is an illustration of a system 1100 that can facilitate communications associated with a mobile device in a wireless communication system in accordance with an aspect of the disclosed subject matter. System 1100 can comprise a base station 102 (e.g., access point, . . . ) with a receiver 1102 that can receive signal(s) from one or more mobile devices 116 through a plurality of receive antennas 1104, and a transmitter 1106 that can transmit signals (e.g., data) to the one or more mobile devices 116 through a transmit antenna 1108. Receiver 1102 can receive information from receive antennas 1104 and can be operatively associated with a demodulator 1110 that can demodulate received information. Demodulated symbols can be analyzed by a processor 1112 that can be a processor dedicated to analyzing information received by receiver 1102 and/or generating information for transmission by a transmitter 1106, a processor that controls one or more components of base station 102, and/or a processor that both analyzes information received by receiver 1102, generates information for transmission by transmitter 1106, and controls one or more components of base station 102. The base station 102 can also comprise a modulator 1114 that can work in conjunction with the transmitter 1106 to facilitate transmitting signals (e.g., data) to, for instance, a mobile device 116, another device, etc.

Processor 1112 can be connected with selector 402 that can select a UE dynamic capability to be utilized by a mobile device 116 during a connection and/or communication associated with the mobile device 116. It is to be appreciated and understood that the selector 402 can be the same or similar as, and/or can comprise the same or similar functionality as, respective components, such as more fully described herein, for example, with regard to system 400. It is to be further appreciated and understood that selector 402 can be a stand-alone unit (as depicted), can be included within the processor 1112, can be incorporated within another component, and/or virtually any suitable combination thereof, as desired.

Processor 1112 can be coupled to a data store 404 that can store information related to data to be transmitted, received data, information related to selecting UE capability (e.g., UE dynamic capability) associated with a mobile device 116, and any other suitable information that can facilitate selecting UE dynamic capability associated with a mobile device (e.g., 116) during a connection of the mobile device to the network (e.g., base station and core network). Data store 404 can additionally store protocols and/or algorithms associated with and facilitating selecting UE capability associated with a mobile device 116. It is to be appreciated and understood that the data store 404 can be the same or similar as, and/or can comprise the same or similar functionality as, respective components, such as more fully described herein, for example, with regard to system 400.

Figure 12:
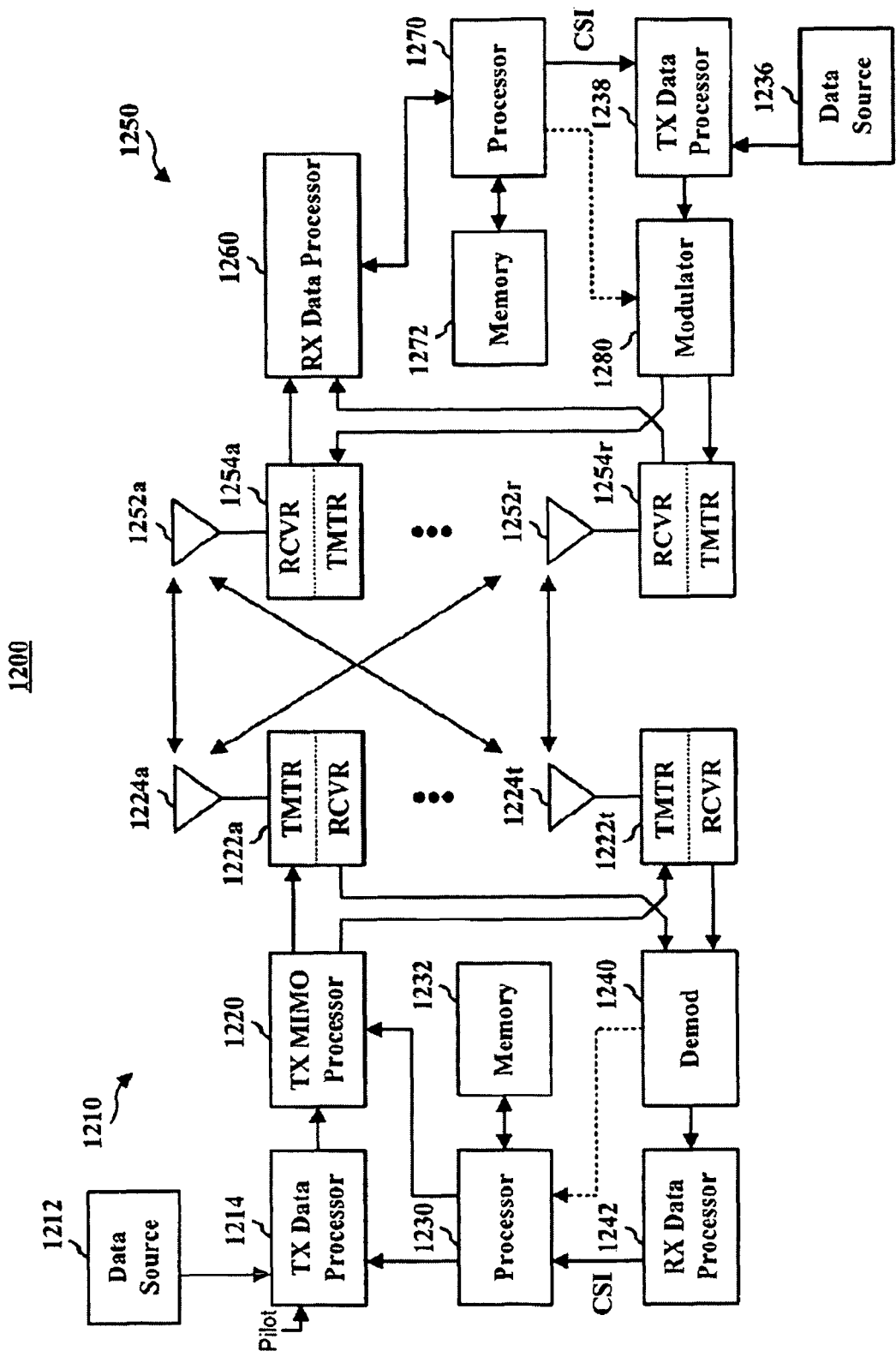
FIG. 12 is an illustration of an example wireless network system that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-4, and 10-11) and/or methods (FIGS. 7-9) described herein to facilitate wireless communication there between. It is to be appreciated that base station 1210 and mobile device 1250 each can be respectively the same or similar as, and/or can comprise respectively the same or similar functionality as, respective components as more fully described herein, such as, for example, with regard to system 100, system 200, system 300, system 400, system 1000, and/or system 1100.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to use (discussed below). Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message and can determine which preceding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing Radio Resource Control (RRC) connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (Discontinuous Reception or DRX cycle is indicated by the network to the UE), broadcasted over entire cell and mapped to physical (PHY) resources which can be used for other control/traffic channels. The UL Transport Channels comprises a Random Access Channel (RACH), a Request Channel (REQCH), an Uplink Shared Data Channel (UL-SDCH) and plurality of PHY Channels. The PHY channels comprises a set of DL channels and UL channels.

The DL PHY channels can comprise: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), Load Indicator Channel (LICH).

The UL PHY Channels can comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), Broadband Pilot Channel (BPICH).

In an aspect, a channel structure is provided that preserves low PAR (at any given time, the channel is contiguous or uniformly spaced in frequency) properties of a single carrier waveform.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
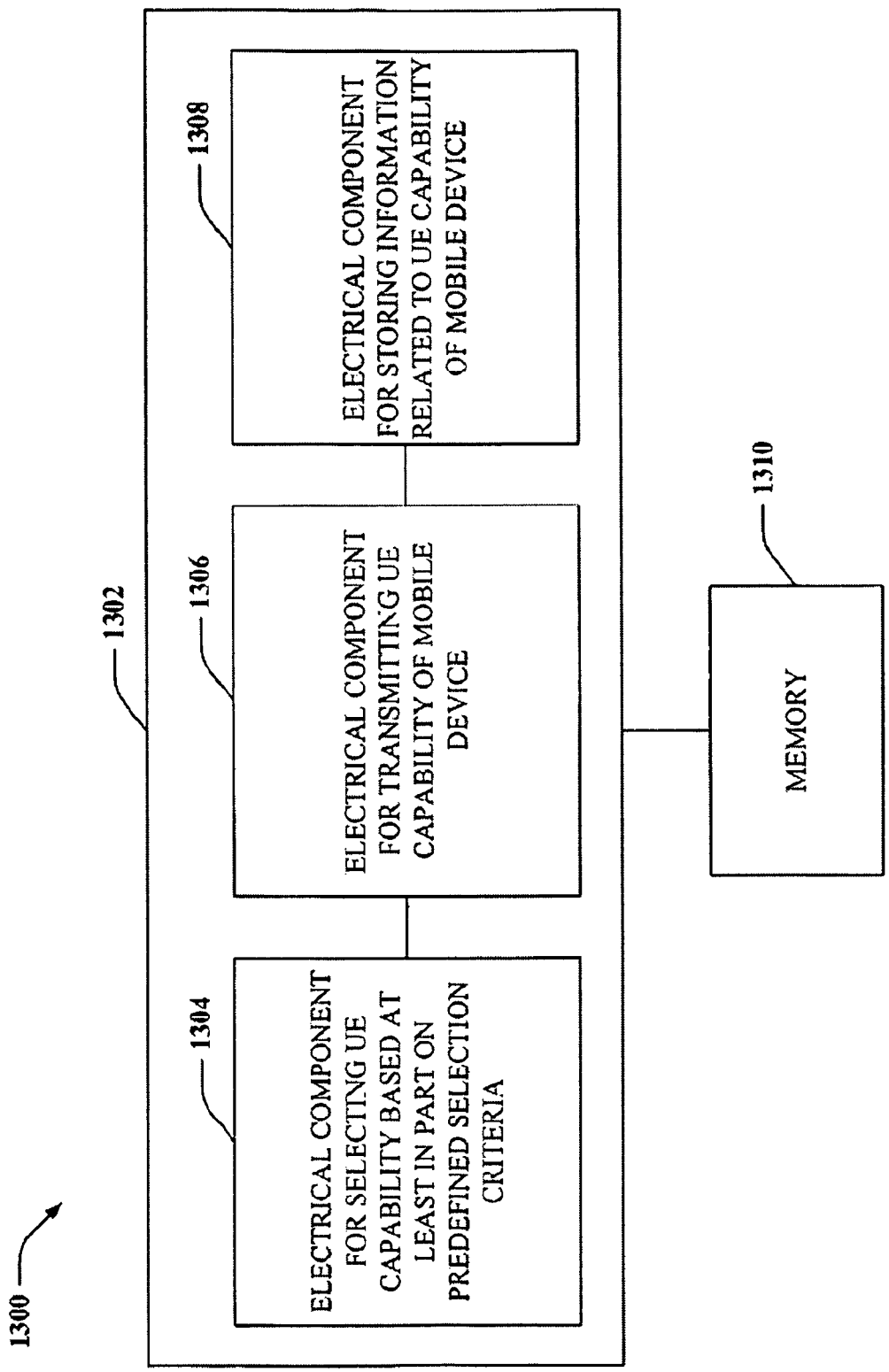
FIG. 13 is a depiction of an example system that can facilitate communication associated with a mobile device in a wireless communication environment.

With reference to FIG. 13, illustrated is a system 1300 that can facilitate communication associated with a mobile device in a wireless communication environment. For example, system 1300 can reside at least partially within a mobile device (e.g., 116). It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction.

For instance, logical grouping 1302 can include an electrical component for selecting UE capability (e.g. UE dynamic capability) based at least in part on predefined selection criteria 1304. For instance, the selecting UE capability can analyze the type of communication (e.g., phone call, instant message, . . . ) and/or whether the communication is UL focused or DL focused, for example, and based at least in part on predefined selection criteria, can select a desired (e.g., optimal) UE dynamic capability for the connection with the base station 102 (and core network 202) and/or communication associated with the mobile device 116. Further, logical grouping 1302 can comprise an electrical component for transmitting UE capability 1306. For example, UE capability, such as UE dynamic capability and/or UE semi-static capability, associated with the mobile device 116 can be transmitted to a base station 102, as desired. Logical grouping 1302 also can include an electrical component for storing information related to UE capability associated with a mobile device (e.g., 116) 1308. Additionally, system 1300 can include a memory 1310 that retains instructions for executing functions associated with electrical components 1304, 1306, and 1308. While shown as being external to memory 1310, it is to be understood that one or more of electrical components 1304, 1306, and 1308 can exist within memory 1310.

Figure 14:
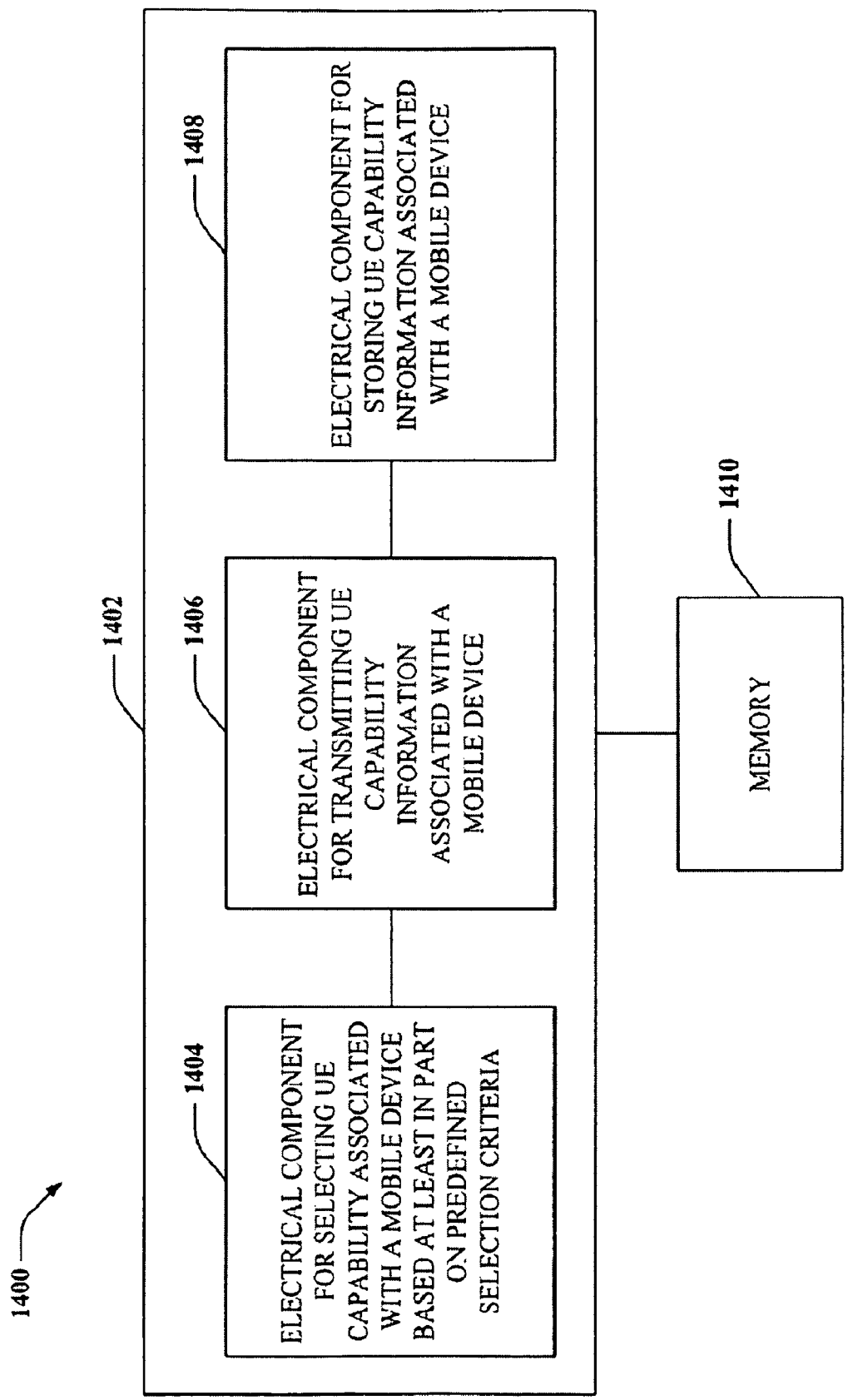
FIG. 14 is an illustration of another example system that can facilitate communication associated with a mobile device in a wireless communication environment.

Turning to FIG. 14, illustrated is a system 1400 that can facilitate communication associated with a mobile device in a wireless communication environment. For example, system 1400 can reside at least partially within a base station 102 that can be associated (e.g., wirelessly connected) with a mobile device (e.g., 116). It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction.

In one aspect, logical grouping 1402 can include an electrical component for selecting UE capability (e.g., UE dynamic capability) associated with a mobile device (e.g., 116) based at least in part on predefined selection criteria 1404. For instance, the selecting UE capability can analyze information related to the connection (e.g., with the mobile device) and/or communication, such as, for example, type of communication (e.g., phone call, page, instant message, . . . ) and/or whether the communication is UL focused or DL focused, and based at least in part on predefined selection criteria, can select a desired (e.g., optimal) UE dynamic capability for the connection and/or communication associated with the mobile device (e.g., 116). Further, logical grouping 1402 can comprise an electrical component for transmitting UE capability 1406. For example, UE capability, such as UE dynamic capability and/or UE semi-static capability, associated with the mobile device can be transmitted to the mobile device to facilitate selection and configuring of the mobile device to communicate using a desired UE dynamic capability, and/or can be transmitted to the core network 202 to facilitate connection of the mobile device with the base station 102 and core network 202 and/or selection of a desired UE dynamic capability for the mobile device. Logical grouping 1402 also can include an electrical component for storing information related to UE capability associated with a mobile device (e.g., 116) 1408. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
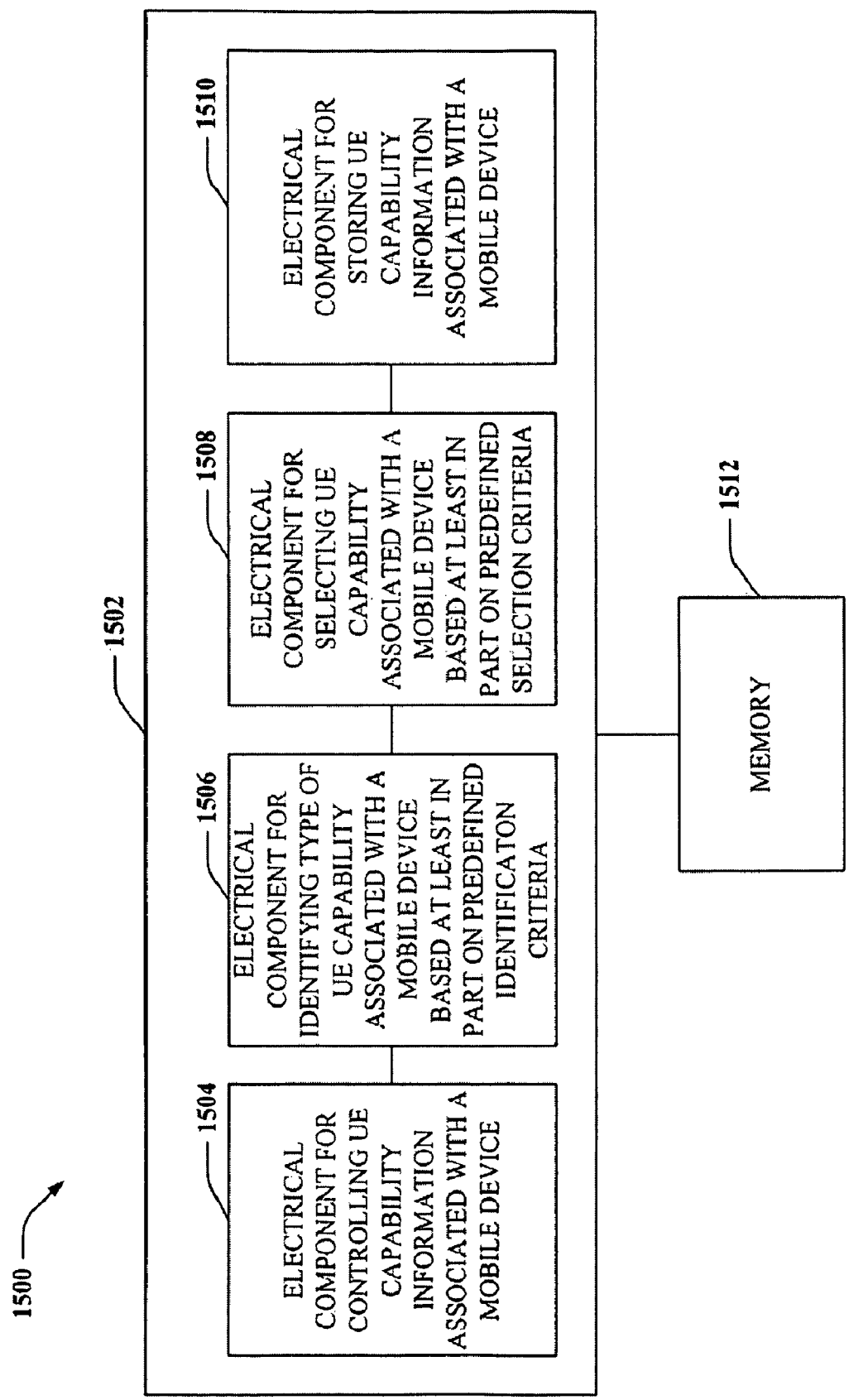
FIG. 15 is an illustration of an example system that can facilitate communications associated with a mobile device in a wireless communication environment.

Referring to FIG. 15, illustrated is a system 1500 that can facilitate communications associated with a mobile device in a wireless communication environment. System 1500 can reside within a core network (e.g., 202), for instance. As depicted, system 1500 includes functional blocks that can represent functions implemented by a processor, software, or combination thereof (e.g., firmware). System 1500 includes a logical grouping 1502 of electrical components that can act in conjunction.

Logical grouping 1502 can include an electrical component for controlling UE capability information associated with a mobile device(s) (e.g., 116) 1504. For instance, the controlling of a UE capability information (e.g., UE dynamic capability, UE semi-static capability) can relate to controlling storage of UE capability of a mobile device(s) and/or deleting and discarding of respective types of UE capability (e.g., UE dynamic capability, UE semi-static capability) depending in part on a state of the connection with a mobile device. For example, UE semi-static capability information and UE dynamic capability information can be stored in the core network 202 during a connection with the mobile device. If the mobile device is transitioned into an idle mode; the dynamic capability information stored in the core network 202 can be deleted or discarded, while the UE semi-static capability information of the mobile device can be retained (e.g., can continue to be stored in the core network 202), so that it can be utilized, as desired, during a subsequent connection between the mobile device, base station, and core network.

Further, logical grouping 1502 can comprise an electrical component for identifying type of UE capability associated with a mobile device(s) (e.g., 116) 1506. For example, identification or classification of type of UE capability can include determining whether received information, or respective portions thereof, is UE dynamic capability information or UE semi-static capability information associated with a mobile device.

Furthermore, logical grouping 1502 can include an electrical component for selecting UE capability (e.g., UE dynamic capability) associated with a mobile device (e.g., 116) based at least in part on predefined selection criteria 1508. For instance, the selecting UE capability can analyze information related to the connection (e.g., with the mobile device) and/or communication, such as, for example, type of communication (e.g., phone call, page, instant message, . . . ) and/or whether the communication is UL focused or DL focused, and based at least in part on predefined selection criteria, can select a desired (e.g., optimal) UE dynamic capability for the connection and/or communication associated with the mobile device (e.g., 116). Moreover, logical grouping 1502 also can include an electrical component for storing information related to UE capability associated with a mobile device (e.g., 116) 1510. Additionally, system 1500 can include a memory 1512 that retains instructions for executing functions associated with electrical components 1504, 1506, 1508, and 1510. While shown as being external to memory 1512, it is to be understood that one or more of electrical components 1504, 1506, 1508 and 1510 can exist within memory 1512.

It is to be appreciated and understood that, while certain aspects of the disclosed subject matter have been described with regard to a single mobile device (e.g., 116), the subject innovation is not so limited, as the subject innovation can be employed to facilitate communication associated with one or more mobile devices, as desired, in a wireless network environment. For example, the core network 202 can facilitate managing (e.g., controlling) UE capability information, such as UE dynamic capability information and/or UE semi-static capability information, respectively associated with each of the one or more mobile devices associated with the core network 202 to facilitate efficient connection of respective mobile devices to the network (e.g., respective base station 102, core network 202) and communication of respective mobile devices associated with the network.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of communication associated with a mobile device, comprising:
   identifying one or more items of information from capability information of the mobile device based at least in part on one or more predefined identification criteria, the one or more items of information comprising at least one of dynamic capability information and semi-static capability information associated with the mobile device;
   controlling storage of capability information associated with a core network;

maintaining storage of the semi-static capability information at the core network after a first connection associated with the mobile device is released;

receiving the capability information associated with the mobile device at the core network; and storing the one or more identified items of information at the core network, further comprising:

deleting from at least one device of the core network the dynamic capability information in response to the first connection associated with the mobile device being released.

2. The method of claim 1, further comprising:

retrieving at the core network the semi-static capability information stored at the core network during a second connection associated with the mobile device, the second connection being subsequent to the first connection; and transmitting the retrieved semi-static capability information to a base station to facilitate selection of a dynamic capability to be utilized by the mobile device during the second connection.

3. The method of claim 1, further comprising:

releasing the first connection associated with the mobile device, the releasing of the first connection comprising transitioning of the mobile device to an idle state.

4. A method of communication associated with a mobile device, comprising:

identifying one or more items of information from capability information of the mobile device based at least in part on one or more predefined identification criteria, the one or more items of information comprising at least one of dynamic capability information and semi-static capability information associated with the mobile device;

controlling storage of capability information associated with a core network;

maintaining storage of the semi-static capability information at the core network after a first connection associated with the mobile device is released, further comprising:

deleting from at least one device of the core network the semi-static capability information when the mobile device is in an off state.

5. A wireless communications apparatus that facilitates communication associated with a mobile device, comprising:

means for respectively identifying dynamic capability and semi-static capability associated with the mobile device based at least in part on one or more predefined identification criteria;

means for controlling storage of capability information associated with the mobile device at a core network; and means for maintaining storage of the semi-static capability information at the core network after a connection associated with the mobile device is released, wherein the means for controlling storage of capability information associated with the mobile device comprises:

means for deleting from at least one device of the core network the dynamic capability information in response to the mobile device transitioning to an idle mode.

6. A computer program product, comprising:

a non-transitory computer-readable medium comprising code for:

identifying one or more items of information from capability information of a mobile device based at least in part on one or more predefined identification criteria, the one or more items of information comprising at least one of dynamic capability information and semi-static capability information associated with the mobile device;

controlling storage of capability information associated with the mobile device at a core network; and maintaining storage of the semi-static capability information at the core network after a connection associated with the mobile device is released, wherein the computer-readable medium further comprises code for:

deleting the dynamic capability information in response to the mobile device transitioning to an idle mode; and retaining the semi-static capability information after the mobile device transitions to the idle mode.

7. The computer program product of claim 6, wherein the computer-readable medium further comprises code for:

transmitting the semi-static capability information from the core network to a base station associated with the mobile device in response to the mobile device transitioning to an active state and requests to establish a connection with the base station, the step of transmitting being performed after the steps of deleting and retaining.

8. In a wireless communications system, an apparatus comprising:

a processor configured to:

identify one or more items of information from capability information of a mobile device based at least in part on one or more predefined identification criteria, the one or more items of information comprising at least one of dynamic capability information and semi-static capability information associated with the mobile device;

manage storage of capability information associated with the mobile device; and maintaining storage of the semi-static capability information at the core network after a connection associated with the mobile device is released, wherein the processor is further configured to:

delete the dynamic capability information associated with the mobile device in response to the mobile device transitioning to an idle mode;

retrieve the semi-static capability information associated with the mobile device from storage of the core network in response to the mobile device subsequently transitioning from the idle mode to an active mode; and transmit the semi-static capability information associated with the mobile device from the core network to a base station associated with the mobile device to facilitate selection of a specified dynamic capability associated with the mobile device to facilitate communication associated with the mobile device.

* * * * *